United States Patent
Awatsuji et al.

(10) Patent No.: US 10,108,145 B2
(45) Date of Patent: Oct. 23, 2018

(54) DIGITAL HOLOGRAPHY DEVICE AND DIGITAL HOLOGRAPHY PLAY METHOD

(71) Applicant: NATIONAL UNIVERSITY CORPORATION KYOTO INSTITUTE OF TECHNOLOGY, Kyoto (JP)

(72) Inventors: Yasuhiro Awatsuji, Kyoto (JP); Ryosuke Yonesaka, Kyoto (JP); Tatsuki Tahara, Kyoto (JP)

(73) Assignee: NATIONAL UNIVERSITY CORPORATION KYOTO INSTITUTE OF TECHNOLOGY, Kyoto (JP)

( * ) Notice: Subject to any disclaimer, the term of this patent is extended or adjusted under 35 U.S.C. 154(b) by 482 days.

(21) Appl. No.: 14/424,524

(22) PCT Filed: Aug. 28, 2013

(86) PCT No.: PCT/JP2013/073025
§ 371 (c)(1),
(2) Date: Feb. 27, 2015

(87) PCT Pub. No.: WO2014/034729
PCT Pub. Date: Mar. 6, 2014

(65) Prior Publication Data
US 2015/0205260 A1    Jul. 23, 2015

(30) Foreign Application Priority Data
Aug. 31, 2012  (JP) ................................ 2012-192659

(51) Int. Cl.
*G03H 1/04* (2006.01)
*G03H 1/08* (2006.01)
(Continued)

(52) U.S. Cl.
CPC ......... *G03H 1/0866* (2013.01); *G03H 1/0443* (2013.01); *G03H 1/10* (2013.01);
(Continued)

(58) Field of Classification Search
None
See application file for complete search history.

(56) References Cited

U.S. PATENT DOCUMENTS 6,246,495 B1 * 6/2001 Yamaguchi .......... G03H 1/0443
359/1
8,675,119 B2 * 3/2014 Nayar .................... G02B 26/06
348/344
(Continued)

FOREIGN PATENT DOCUMENTS

JP      3471556 B2    12/2003
JP    2005051634 A     2/2005
(Continued)

OTHER PUBLICATIONS

Nayar, "High Dynamic Range Imaging: Spatially Varying Pixel Exposures," IEEE (2000).*
(Continued)

*Primary Examiner* — Jayanti K Patel
*Assistant Examiner* — Shadan E Haghani
(74) *Attorney, Agent, or Firm* — Harness, Dickey & Pierce, P.L.C.

(57) ABSTRACT

A digital holography device of an embodiment of the present invention includes: an image sensing device which records, in an image sensor and on the basis of an object, a plurality of holograms that correspond to respective different photographic exposure values; and a computer which (i) generates a high dynamic range hologram, which includes pieces of information ranging from low luminance information to high luminance information, by synthesizing the plurality of
(Continued)

holograms recorded and (ii) generates a reconstructed image of the object by performing arithmetic processing of phase-shift interferometry, diffraction calculation, and/or the like on the basis of the high dynamic range hologram.

16 Claims, 27 Drawing Sheets

(51) Int. Cl.
  *G03H 1/10* (2006.01)
  *G03H 1/18* (2006.01)
  *G03H 1/26* (2006.01)

(52) U.S. Cl.
  CPC ..... *G03H 1/182* (2013.01); *G03H 2001/0447* (2013.01); *G03H 2001/0458* (2013.01); *G03H 2001/0883* (2013.01); *G03H 2001/2655* (2013.01); *G03H 2222/31* (2013.01); *G03H 2223/19* (2013.01); *G03H 2223/22* (2013.01); *G03H 2240/52* (2013.01)

(56) References Cited

U.S. PATENT DOCUMENTS

| | | | |
|---|---|---|---|
| 2002/0130957 A1* | 9/2002 | Gallagher | H04N 1/64 348/222.1 |
| 2006/0256414 A1 | 11/2006 | Baba | |
| 2008/0137933 A1* | 6/2008 | Kim | G01B 9/021 382/131 |
| 2011/0211099 A1* | 9/2011 | Nayar | H01L 27/14621 348/278 |
| 2013/0215730 A1* | 8/2013 | Okamoto | G11B 7/0065 369/103 |

FOREIGN PATENT DOCUMENTS

| | | |
|---|---|---|
| JP | 2006343702 A | 12/2006 |
| JP | 4294526 B2 | 7/2009 |
| JP | 2009192520 A | 8/2009 |
| JP | 2011100204 A | 5/2011 |
| JP | 2011528866 A | 11/2011 |
| JP | 2012053953 A | 3/2012 |

OTHER PUBLICATIONS

Nayar, S. et al., "High Dynamic Range Imaging: Spatially Varying Pixel Exposures," IEEE Conference on CVPR, 2000.
Debevec, P. et al., "Recovering High Dynamic Range Radiance Maps from Photographs," Proc. SIGGRAPH 97', 1997.
Mann, S. et al., "On being 'undigital' with digital cameras: Extending Dynamic Range by Combining Differently Exposed Pictures," Proc. of IS&T's 48th Annual Conference, May 7-11, 1995.
Awatsuji, Y. et al., "Parallel two-step phase-shifting digital holography," Appl. Opt. 47, 2008.
Meng, X.F. et al., "Two-step phase-shifting interferometry and its application in image encryption," Optics Letters, vol. 31, No. 10, pp. 1414-1416, May 15, 2006.
Goodman, J.W. et al., "Digital Image Formation From Electronically Detected Holograms," Applied Physics Letters, vol. 11, No. 3, pp. 77-79, Aug. 1, 1967.
Yamaguchi, I. et al., "Phase-shifting digital holography," Optics Letters, vol. 22, No. 16, pp. 1268-1270, Aug. 15, 1997.
International Preliminary Report on Patentability dated Mar. 5, 2015.
International Search Report dated Oct. 8, 2013.

* cited by examiner (a)

AMPLITUDE DISTRIBUTION (b)

PHASE DISTRIBUTION (a)

AMPLITUDE DISTRIBUTION (b)

PHASE DISTRIBUTION (a)

AMPLITUDE DISTRIBUTION (b)

PHASE DISTRIBUTION

① PHASE SHIFT AMOUNT 0      LOW PHOTOGRAPHIC EXPOSURE VALUE
② PHASE SHIFT AMOUNT 0      HIGH PHOTOGRAPHIC EXPOSURE VALUE
③ PHASE SHIFT AMOUNT $\pi/2$   LOW PHOTOGRAPHIC EXPOSURE VALUE
④ PHASE SHIFT AMOUNT $\pi/2$   HIGH PHOTOGRAPHIC EXPOSURE VALUE (a)

AMPLITUDE DISTRIBUTION (b)

PHASE DISTRIBUTION

FIG. 28

| WAVELENGTH | 532nm |
|---|---|
| DISTANCE BETWEEN OBJECT AND IMAGE SENSOR | 30cm |
| PIXEL SIZE OF IMAGE SENSOR | 3.45mm × 3.45mm |
| PIXEL COUNT OF IMAGE SENSOR | 512 × 512 pixels |
| SIZE OF OBJECT | 1.77mm × 1.77mm |
| AMPLITUDE OF REFERENCE LIGHT | 370 |
| BIT COUNT OF HOLOGRAM | 8bit |
| DYNAMIC RANGE OF IMAGE SENSOR | 20dB |

DIGITAL HOLOGRAPHY DEVICE AND DIGITAL HOLOGRAPHY PLAY METHOD

CROSS REFERENCE TO RELATED APPLICATIONS

This is a National Phase Application of PCT/JP2013/073025 filed Aug. 28, 2013, which is an International Application claiming priority to JP Application No. 2012-192659 filed on Aug. 31, 2012, the entire contents of which are hereby incorporated by reference.

TECHNICAL FIELD

The present invention relates to a digital holography device and a digital holography reconstruction method.

BACKGROUND ART

Digital holography (hereinafter also referred to as 'DH') which utilizes interference of light is known as conventional art. Digital holography is technology in which an image of a three-dimensional object is reconstructed by use of a computer on the basis of an interference pattern obtained by irradiating the three-dimensional object with light. The interference pattern is formed by interference between (i) object light obtained by irradiating the three-dimensional object with light and (ii) reference light provided from a light source that is used for irradiating the three-dimensional object with light, and the interference pattern is recorded by use of an image sensor such as a CCD or a CMOS. On the basis of the interference pattern recorded, the computer performs diffraction calculation such as the Fresnel transformation, so that a reconstructed image of the three-dimensional object is generated.

Research of digital holography has been conducted mainly in the field of in-line type digital holography. In-line type digital holography has a problem that a reconstructed image is deteriorated because an unnecessary image component such as zeroth-order diffracted light or a conjugate image is included in data recorded by use of a CCD or the like. In order to solve the problem, there has been proposed technology for obtaining a reconstructed image which is free of zeroth-order diffracted light and a conjugate image. This technology is disclosed in Non-patent Literature 1 and Patent Literature 1. There has also been proposed technology called off-axis type digital holography, in which object light and reference light are caused to enter an image sensor so as to have an angle between the object light and the reference light, so that a desired image component and an unnecessary image component are spatially separated from each other.

However, employing the technology disclosed in Non-patent Literature 1 and Patent Literature 1 or off-axis type digital holography still has a problem. That is, since recording of an interference pattern is performed by use of an image sensor, an interference pattern that contains a halation or a blackening is recorded due to an insufficient dynamic range of the image sensor. This prevents a reconstructed image having a high image quality from being obtained.

On the other hand, in the field of an image sensing device such as a digital still camera or a digital movie camera, high dynamic range synthesis is employed as technology for preventing an image containing a halation or a blackening from being recorded. High dynamic range synthesis is technology in which (ii) image parts having no halation or blackening are selected from a plurality of images obtained by recording an image of an identical object a plurality of times with use of respective different photographic exposure values and (ii) the image parts selected are synthesized into a single image. High dynamic range synthesis can reproduce gray scales of parts ranging from a bright part to a dark part within an image from which halation and blackening have been eliminated.

CITATION LIST

Patent Literature

Patent Literature 1
Japanese Patent No. 4294526 (Registration Date: Apr. 17, 2009)

Non-Patent Literatures

Non-patent Literature 1
I. Yamaguchi and T. Zhang, Opt. Lett. 22, p. 1268 (1997)
Non-Patent Literature 2
J. W. Goodman and R. W. Lawrence, Appl. phys. Lett. 11, p. 77 (1967)
Non-Patent Literature 3
X. F. Meng, et. al., Opt. Lett 31 (2006) 1414
Non-Patent Literature 4
Y. Awatsuji, et. al., Appl. Opt. 47 (2008) D183
Non-Patent Literature 5
S. Mann and R. W. Picard, Proc. of IS&T's 48th Annual Conference (1995) 442
Non-Patent Literature 6
P. E. Debevec and J. Malik, Proc. SIGGRAPH 97' (1997) 369
Non-Patent Literature 7
S. K. Nayar and T. Mitsunaga, IEEE Conference on CVPR, 1 (2000) 472

SUMMARY OF INVENTION

Technical Problem

In order for a reconstructed image generated by digital holography to be a sharp image containing no halation or blackening, it is possible to apply known high dynamic range synthesis to the field of the above-described image sensing devices. In this case, (i) a plurality of reconstructed images are generated from a plurality of types of interference patterns recorded with use of respective different photographic exposure values and (ii) the reconstructed images are subjected to high dynamic range synthesis to thereby generate a single synthesized image.

However, in digital holography, information of an object is recorded such that the information is distributed into interference patterns. As such, unlike a typical camera image, a relation between a brightness of an interference pattern and a luminance of a reconstructed image is not a simple correlation. That is, there is not necessarily a simple relation in which an image containing a halation is obtained from a hologram containing a halation and an image containing a blackening is reconstructed from a hologram containing a blackening. Accordingly, the technology of high dynamic range synthesis, which is known in the field of the above-described image sensing devices, cannot be applied as it is to digital holography.

Note that in digital holography, in order to record a hologram free of halation and blackening and generate a reconstructed image having a high image quality, it is also possible to record an interference pattern within a dynamic range of an image sensor by manually making adjustment to attain a proper photographic exposure condition. However, this requires that adjustment for attaining a proper photographic exposure condition be made every time a recording operation is performed, and accordingly, usability is impaired. In addition, there is a problem that a dynamic range of an interference pattern is broader than a dynamic range of an image sensor, so that (i) an interference pattern cannot be recorded within the dynamic range of the image sensor no matter what photographic exposure condition is secured by adjustment or (ii) it is even difficult to set a proper photographic exposure condition. It is desirable to solve these problems so as to make it possible to generate, regardless of a photographic exposure condition, a reconstructed image that has no deterioration in image quality caused by a halation or a blackening.

The present invention is made in order to solve the problem. An object of the present invention is to provide a digital holography device and a digital holography reconstruction method each of which makes it possible to reconstruct an image that has no deterioration in image quality caused by a halation or a blackening.

Solution to Problem

In order to attain the object, a digital holography device of the present invention is a digital holography device including: a recording section recording, in an image sensor and on the basis of object light that corresponds to an object and reference light that has a first phase, a first hologram group including a plurality of first holograms that correspond to respective different photographic exposure values; a high dynamic range hologram-generating section generating a first high dynamic range hologram by synthesizing the first hologram group recorded, the first high dynamic range hologram including pieces of information ranging from low luminance information to high luminance information; and a reconstructed image-generating section generating a reconstructed image of the object by performing arithmetic processing of diffraction calculation on the basis of the first high dynamic range hologram.

According to the configuration above, the subject of the high dynamic range synthesis is holograms. Accordingly, an influence of a halation and a blackening which cause deterioration in image quality of a reconstructed image can be eliminated from the holograms, so that a reconstructed image having a high image quality can be generated. This makes it possible to provide a digital holography device that enables to reconstruct an image having no deterioration in image quality caused by a halation or a blackening.

In order to attain the object, a digital holography reconstruct method of the present invention is a digital holography reconstruct method including the steps of: recording, in an image sensor and on the basis of object light that corresponds to an object and reference light that has a first phase, a first hologram group including a plurality of first holograms that correspond to respective different photographic exposure values; generating a first high dynamic range hologram by synthesizing the first hologram group recorded, the first high dynamic range hologram including pieces of information ranging from low luminance information to high luminance information; and generating a reconstructed image of the object by performing arithmetic processing of diffraction calculation on the basis of the first high dynamic range hologram.

According to the configuration above, it becomes possible to provide a digital holography reconstruct method that enables to reconstruct an image having no deterioration in image quality caused by a halation or a blackening.

Advantageous Effects of Invention

The present invention makes it possible to reconstruct an image having no deterioration in image quality caused by a halation or a blackening. That is, in the holography device of the present invention, an attention was paid for the first time to the fact that a halation and a blackening in a hologram do not result in a halation and a blackening in a reconstructed image but are a cause of unclearness of the reconstructed image. On the basis of this, it was further found that a reconstructed image in which an influence of a halation and a blackening is minimized can be obtained by obtaining a hologram having a high dynamic range. Accordingly, it was arrived at for the first time that a typical camera image cannot be free of halation and blackening unless the camera image is synthesized from an image that is completely free of halation and blackening, whereas according to the holography device, it is not only as a matter of course possible to obtain a sharp reconstructed image if a hologram is completely free of halation and blackening, but it is also possible, even from, for example, a hologram that is not completely free of halation and blackening, to reconstruct a sharp image as free as possible of an influence of halation and blackening, by performing synthesis of a hologram having a high dynamic range.

BRIEF DESCRIPTION OF DRAWINGS

FIG. 28 is a view showing parameters used in a computer simulation.

DESCRIPTION OF EMBODIMENTS

The following description will discuss embodiments of the present invention with reference to drawings. In the description below, the same reference sign will be given to identical members, and the identical members have the same name and the same function as well. Therefore, detailed descriptions on such members will not be repeated.

First Embodiment: Phase-Shift DH Device

A First Embodiment will describe an example in which the present invention is applied to a phase-shift DH device.

(Phase-Shift DH Device of Sequential Recording Type)

Figure 1:
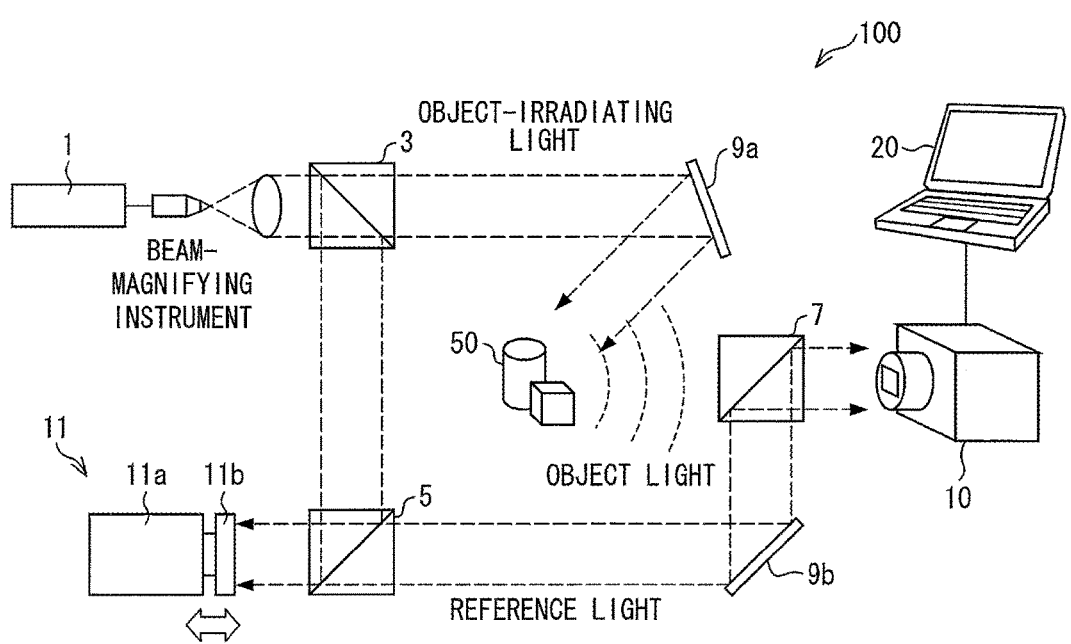
FIG. 1 is a view illustrating an example of a digital holography device in a First Embodiment of the present invention.

FIG. 1 is a view illustrating an example of a digital holography device in the First Embodiment of the present invention. As illustrated in FIG. 1, a phase-shift digital holography device 100, which is an example of the digital holography device, includes a laser 1, beam splitter elements 3 and 5, a beam-combining element 7, mirrors 9a and 9b, an image sensing device (recording section) 10, a piezoelectric element-driven reflecting mirror 11, and a computer 20.

The laser 1 emits vertically-polarized laser light, which then enters the beam splitter element 3 through a beam-magnifying instrument. The beam splitter element 3 is an optical element for splitting laser light, and causes laser light emitted from the laser 1 and having entered the beam splitter element 3 to be split in two directions. Laser light that is one of laser light thus split by the beam splitter element 3 in the two directions is reflected from the mirror 9a as object-irradiating light, and is applied to an object 50. The laser light applied to the object 50 turns into object light, and passes through the beam-combining element 7 so as to enter an image sensor plane of the image sensing device 10 as object light.

On the other hand, laser light that is the other one of the laser light thus split by the beam splitter element 3 in the two directions further passes through the beam splitter element 5 so as to be applied to the piezoelectric element-driven reflecting mirror 11. The piezoelectric element-driven reflecting mirror 11 includes a piezoelectric element 11a and a reflecting mirror 11b, and the laser light applied to the reflecting mirror 11b is reflected from the reflecting mirror 11b and then reflected from the mirror 9b. The light thus reflected from the mirror 9b passes through the beam-combining element 7 and enters the image sensor plane of the image sensing device 10 as reference light.

The piezoelectric element-driven reflecting mirror 11 causes the reflecting mirror 11b to be moved by the piezoelectric element 11a, so that a distance between the reflecting mirror 11b and the mirror 9b is changed. This causes a change in optical path length and, accordingly, shifts a phase of the reference light. Note that in the following description, an amount of a shift caused in phase of reference light with respect to laser light emitted from the laser 1 is referred to as a phase shift amount.

The image sensing device 10 has the image sensor plane in which CCDs are two-dimensionally arranged as image sensors. In a case where reference light that enters the image sensor plane at an angle perpendicular to the image sensor plane and object light interfere with each other, an interference pattern is formed. The image sensing device 10 generates first hologram data by recording, as a hologram, the interference pattern formed on the image sensor plane.

As described above, the piezoelectric element-driven reflecting mirror 11 can cause a change in phase value of reference light, and the image sensing device 10 can record holograms sequentially over respective different lengths of photographic exposure time. This allows the image sensing device 10 to generate, for each phase shift amount, the first hologram data which are a plurality of holograms corresponding to respective different photographic exposure values.

The computer 20 generates a reconstructed image on the basis of first hologram data generated by the image sensing device 10. Specifically, computer 20 generates the reconstructed image by (i) performing high dynamic range synthesis with use of, among the first hologram data, hologram data that are obtained with use of respective different photographic exposure values and an identical phase shift amount and (ii) then performing predetermined arithmetic processing. That is, the computer 20 includes a high dynamic range hologram-generating section which performs the high dynamic range synthesis and a reconstructed image-generating section which generates a reconstructed image by performing the predetermined arithmetic processing. The arithmetic processing is arithmetic processing normally carried out in phase-shift digital holography, and includes a complex amplitude distribution calculation process for calculating a complex amplitude distribution (phase-shift interferometry) and a diffraction calculation process such as the Fresnel transformation.

Various methods can be encompassed in the high dynamic range synthesis performed in the present invention. Note that the high dynamic range synthesis in the present invention is technology that was obtained by the present inventors by applying the technology disclosed in the Non-patent Literature 2 to hologram. The high dynamic range synthesis in the present invention is a process in which a plurality of holograms obtained by recording an identical object 50 a plurality of times with use of respective different photographic exposure values are synthesized into a single hologram in which gray scales of parts ranging from a bright part to a dark part are reproduced.

Figure 26:
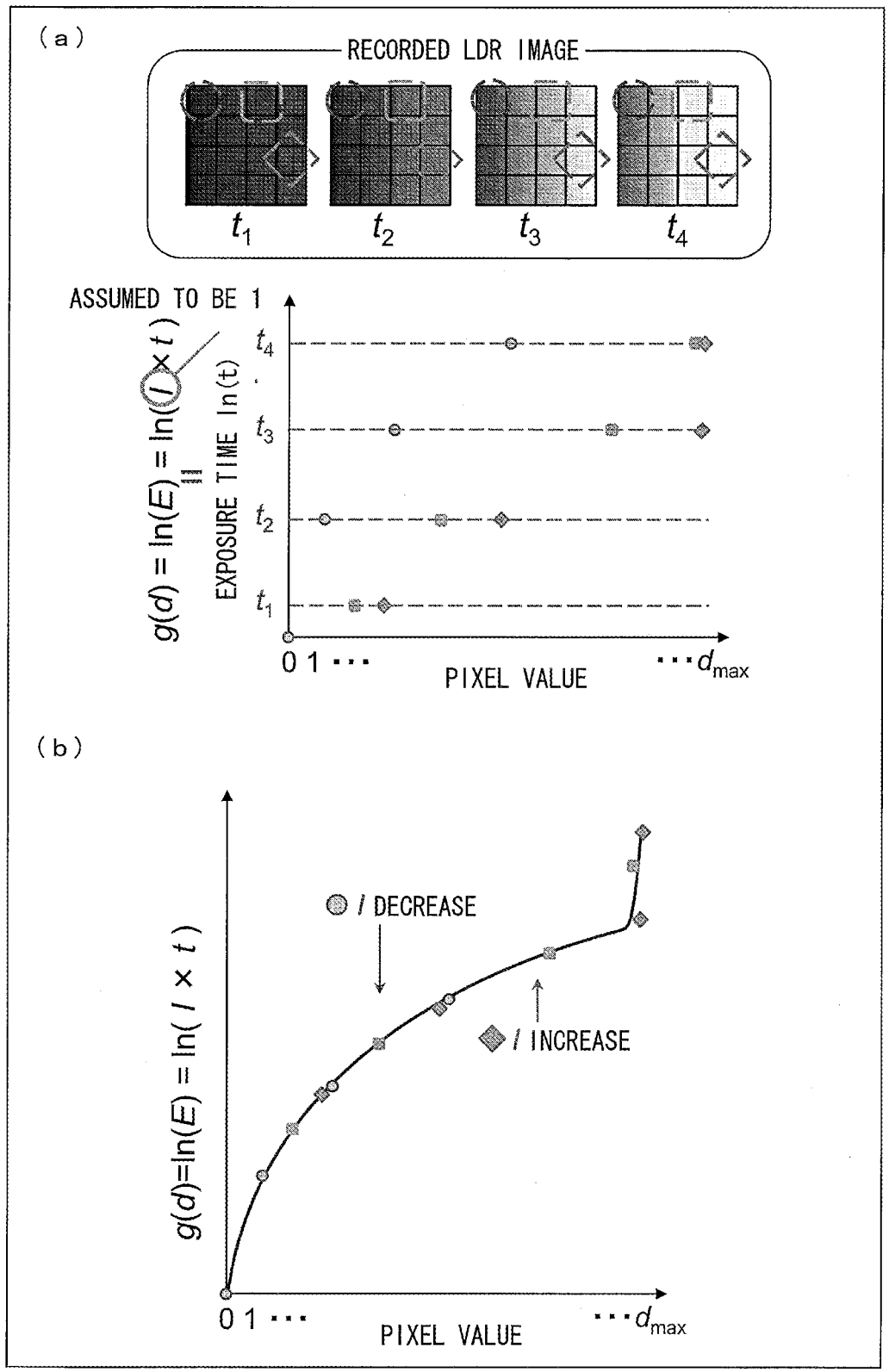
FIG. 26 is a view illustrating a camera response function.
Figure 27:
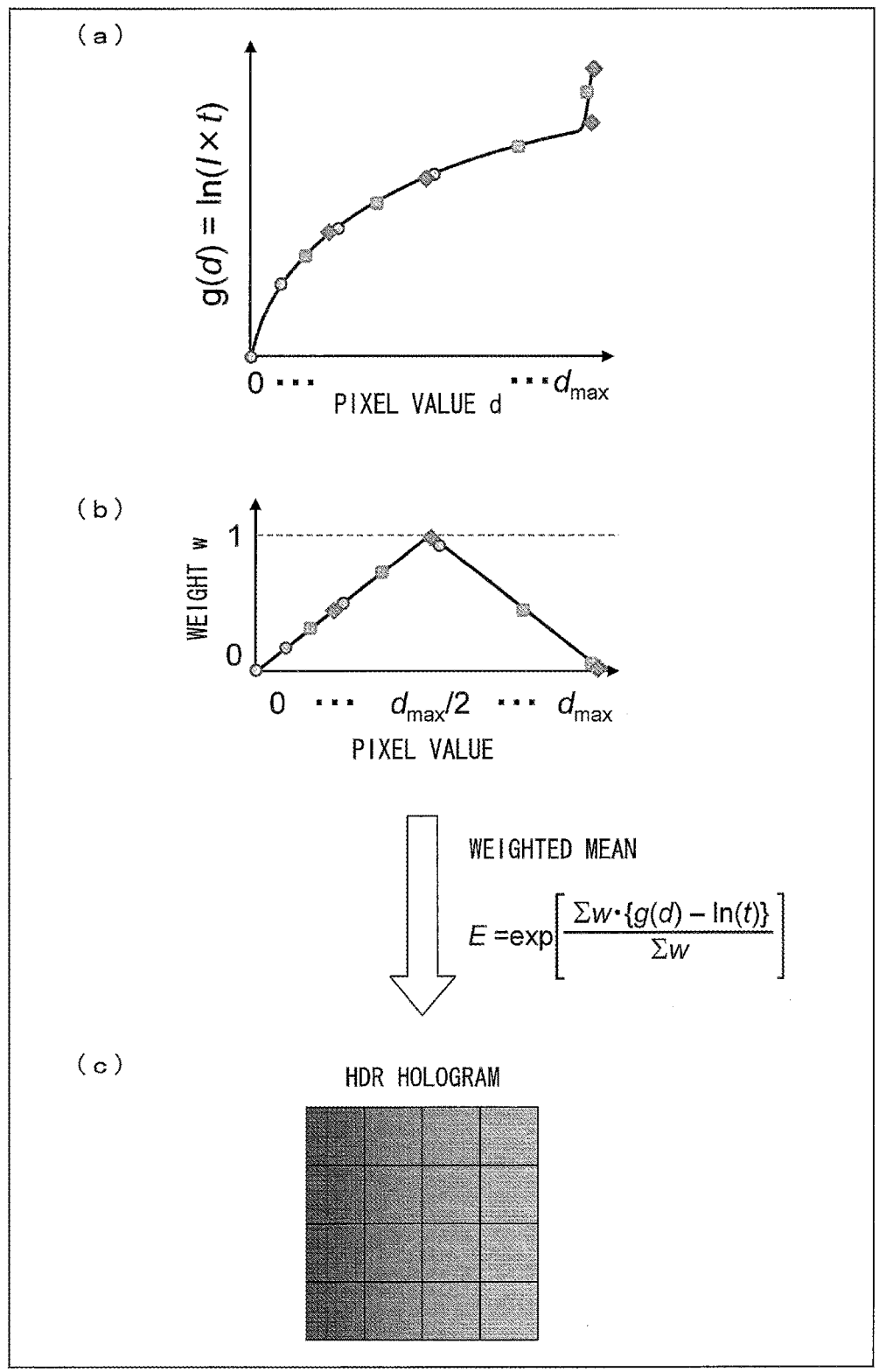
FIG. 27 is a view illustrating a flow of high dynamic range synthesis.

First, the least squares method is used to estimate a camera response function, which indicates a relation between a photographic exposure value and a pixel value (a numerical value which indicates color type or, in a case of an identical color, intensity (brightness)) (see FIGS. 26 and 27). This is because a pixel value does not necessarily increase in proportion to a photographic exposure value in many image sensing devices, depending on a characteristic of an image sensor. In a case where photographic exposure time is adjusted so as to change a photographic exposure value, information on a pixel value and photographic exposure time of each of the plurality of holograms and a weighting function are used in estimation of the camera response function.

The weighting function is designed to (i) have a minimum value when the pixel value has a maximum value (halation) and a minimum value (blackening) and (ii) have a maximum value when the pixel value has an intermediate value (see (b) of FIG. 27). As photographic exposure becomes excessive or insufficient, an amount of information and reliability of a recorded image decrease. As such, by performing weighing as described above, it is possible to exclude, from the calculation, information whose amount and reliability are low.

Next, a weighted mean of pixel values of a plurality of images is calculated, and a hologram in a high dynamic range is synthesized ((a) through (c) of FIG. 27). A weighting function, photographic exposure time of the respective images, and an estimated camera response function are used in the synthesis of the hologram in the high dynamic range.

The computer 20 performs a complex amplitude distribution calculation process to thereby calculate a complex amplitude distribution of the image sensor plane of the image sensing device 10 with respect to a plurality of first synthesized hologram data obtained by high dynamic range synthesis. Further, the computer 20 performs a diffraction calculation process such as the Fresnel transformation to thereby convert, into an optical wave front, the complex amplitude distribution calculated by the complex amplitude distribution calculation process.

The following description will specifically discuss, with reference to drawings, a flow of a process of generating a reconstructed image on the basis of first hologram data generated by the phase-shift digital holography device 100. Note that by causing the piezoelectric element-driven reflecting mirror 11 to shift a phase of reference light as described above, the phase-shift digital holography device 100 can convert the reference light to reference light having a different phase value. The phase-shift digital holography device 100 can therefore serve as a two-step phase-shift digital holography device or a four-step phase-shift digital holography device.

Figure 2:
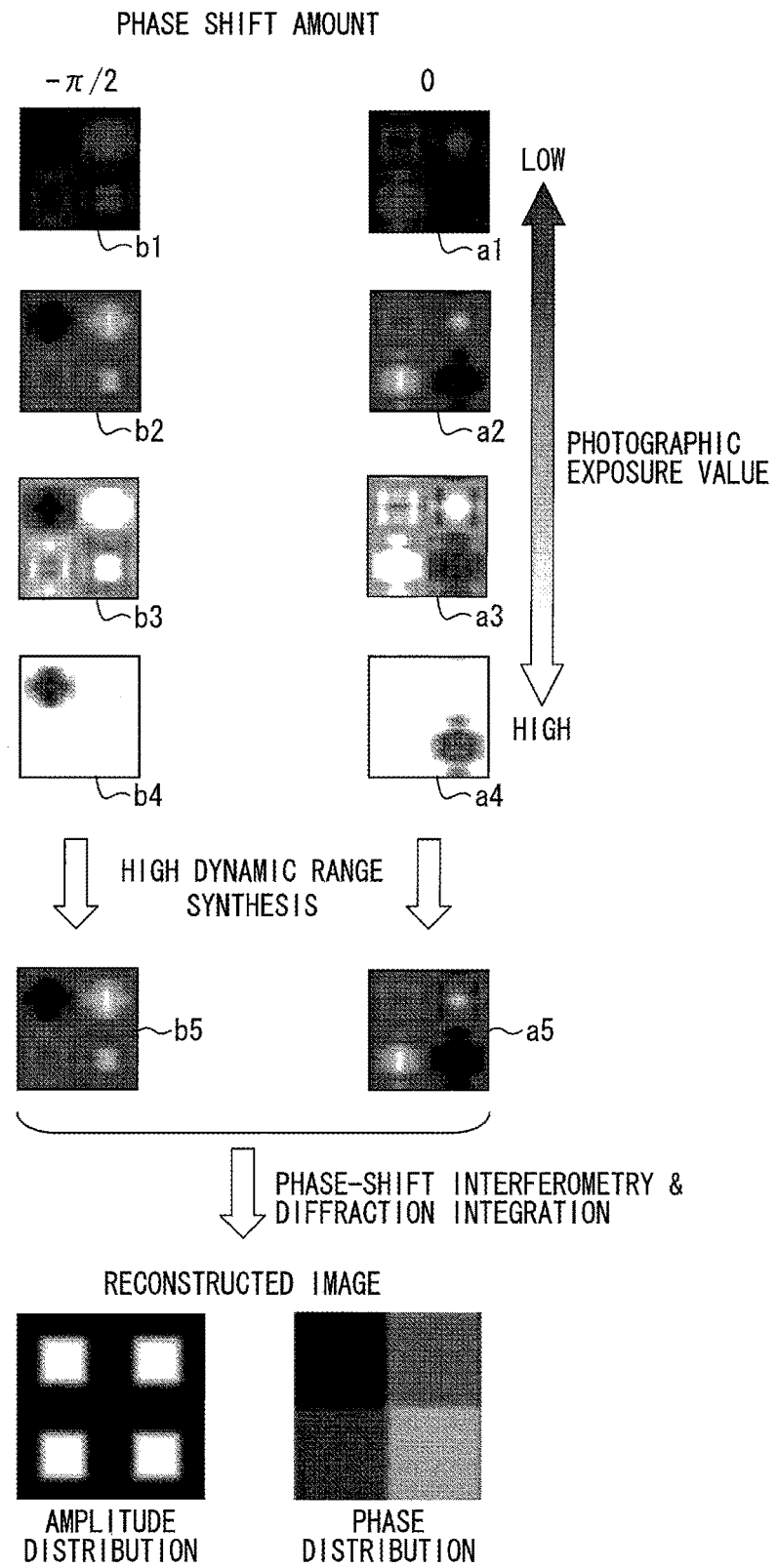
FIG. 2 is a view illustrating a flow of a process of generating a reconstructed image with use of a two-step phase-shift digital holography device in the First Embodiment.

FIG. 2 is a view illustrating a flow of a process of generating a reconstructed image with use of a two-step phase-shift digital holography device in the First Embodiment. As illustrated in FIG. 2, the image sensing device 10 records (i) first hologram data of holograms a1 through a4 recorded by recording, a plurality of times with use of respective different photographic exposure values, an interference pattern that corresponds to a phase shift amount of 0 (first phase) and (ii) first hologram data of holograms b1 through b4 recorded by recording, a plurality of times with use of respective different photographic exposure values, an interference pattern that corresponds to a phase shift amount of $-\pi/2$ (second phase). Note that among each of (i) the holograms a1 through a4 and (ii) the holograms b1 through b4, a photographic exposure value increases as a reference sign has a greater number.

Further, the first hologram data of the holograms a1 through a4 are subjected to high dynamic range synthesis, so that first synthesized hologram data of a synthesized hologram a5 is generated. The first hologram data of the holograms b1 through b4 are subjected to high dynamic range synthesis, so that first synthesized hologram data of a synthesized hologram b5 is generated. Then, the above-described predetermined arithmetic processing is performed on the first synthesized hologram data of the synthesized hologram a5 and the first synthesized hologram data of the synthesized hologram b5, an amplitude distribution and a phase distribution are generated as a reconstructed image.

A brightness or darkness of the amplitude distribution indicates luminance, and the brighter the amplitude distribution is, the higher the pixel value is. A brightness or darkness of the phase distribution indicates a delay in a phase of light that has been scattered by or passed through the object 50. The darker the phase distribution is, the more the phase is delayed.

Figure 3:
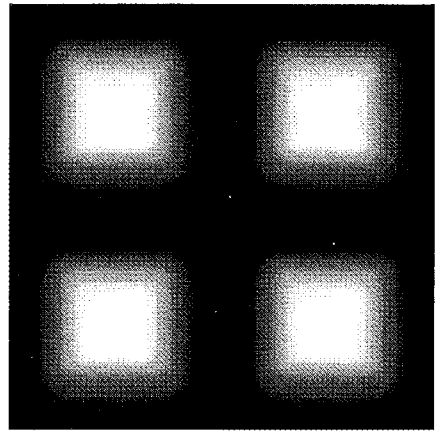
FIG. 3 is a view illustrating an amplitude distribution and a phase distribution of an object.
Figure 3:
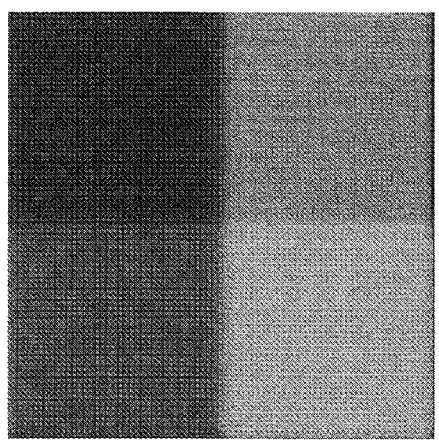

(a) and (b) of FIG. 3 are views respectively illustrating an amplitude distribution and a phase distribution of an object. (a) and (b) of FIG. 4 and (a) and (b) of FIG. 5 illustrate results each obtained in a case where a reconstructed image generated by the two-step phase-shift digital holography device was generated by computer simulation. Note that parameters used in the computer simulation are shown in FIG. 28. (a) and (b) of FIG. 4 illustrate a reconstructed image generated in a case where high dynamic range synthesis was not applied, and (a) and (b) of FIG. 5 illustrate a reconstructed image generated in a case where high dynamic range synthesis was applied.

Figure 4:
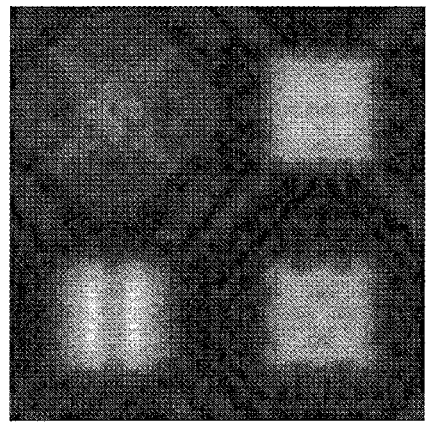
FIG. 4 is a first view illustrating a result obtained in a case where a reconstructed image generated by the two-step phase-shift digital holography device in the First Embodiment is generated by computer simulation.
Figure 4:
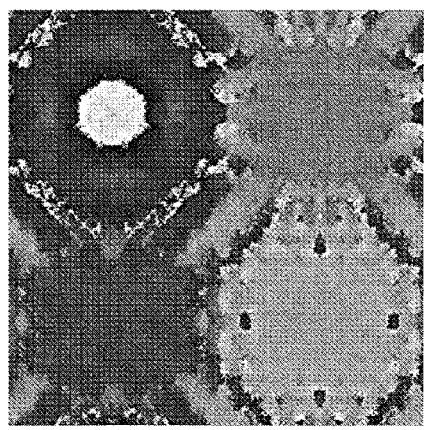
Figure 5:
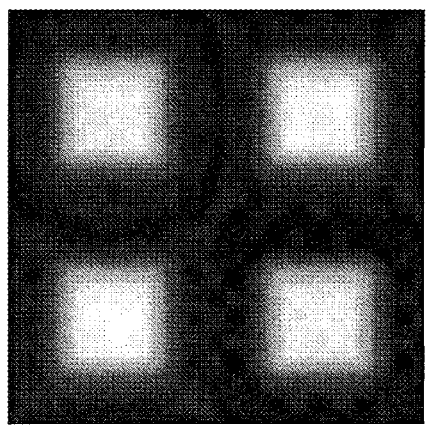
FIG. 5 is a second view illustrating a result obtained in a case where a reconstructed image generated by the two-step phase-shift digital holography device in the First Embodiment is generated by computer simulation.
Figure 5:
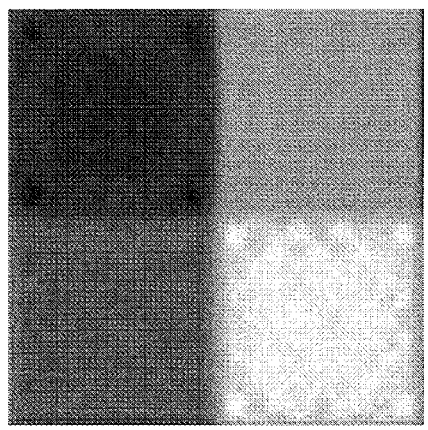

As shown in (a) and (b) of FIG. 4, in the case where high dynamic range synthesis was not applied, deterioration in image quality is observed both in the amplitude distribution and the phase distribution. The deterioration in image quality is caused by a halation and a blackening in the hologram. Particularly in the phase distribution, a boundary between a bright portion and a dark portion is difficult to recognize. On the other hand, as shown in (a) and (b) of FIG. 5, in the case where high dynamic range synthesis was applied, an image having an amplitude distribution and a phase distribution similar to those of the object 50 illustrated in (a) and (b) of FIG. 3 was successfully generated. Particularly in the phase distribution, a boundary between a bright portion and a dark portion is easier to recognize, as opposed to the boundary that is difficult to recognize in the reconstructed image generated in the case where high dynamic range synthesis was not applied. Therefore, in contrast to the case where high dynamic range synthesis was not applied, an improved image quality is observed in the reconstructed image in the case where high dynamic range synthesis was applied.

Modified Example 1: Phase-Shift DH Device of Simultaneous Recording Type

The phase-shift digital holography device 100 in the First Embodiment sequentially records holograms to thereby record a plurality of first hologram data elements corresponding to respective different photographic exposure values. A phase-shift digital holography device in a Modified Example 1 uses means for causing a photographic exposure value to vary from pixel to pixel, so that the phase-shift digital holography device records, simultaneously in a single-shot recording, a first parallel hologram obtained with use of a photographic exposure value that varies from pixel to pixel.

Figure 6:
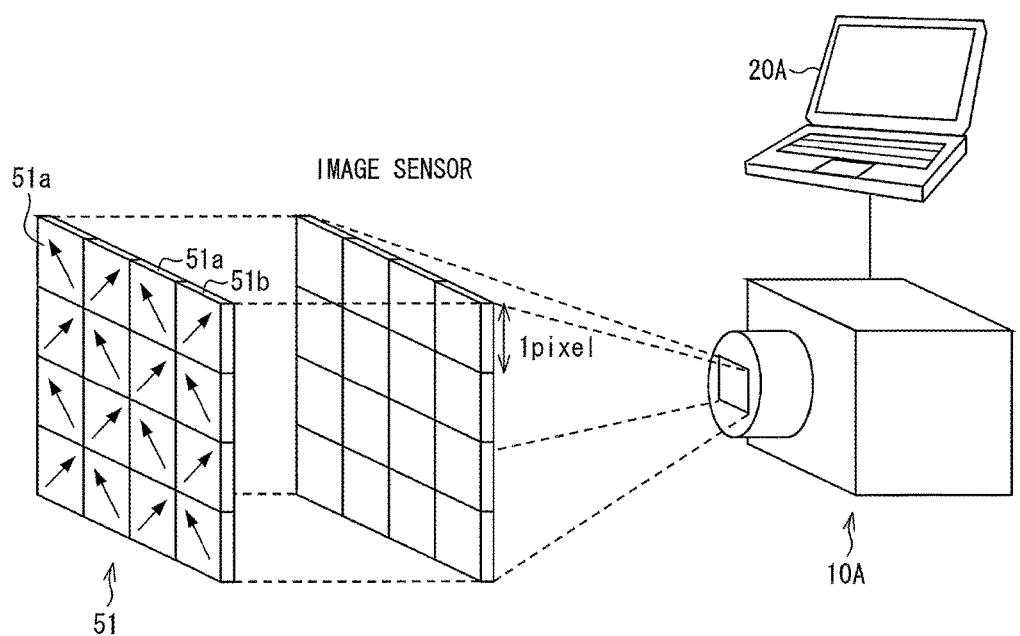
FIG. 6 is a view illustrating an image sensing device in a Modified Example 1.

FIG. 6 illustrates an image sensing device in the Modified Example 1. As illustrated in FIG. 6, an image sensing device 10A includes a polarizer-array device (phase-shift array) 51 attached to an image sensor plane of the image sensing device 10A. Note that for easy explanation, FIG. 6 shows a structure of a partial region of the polarizer-array device 51 instead of a structure of an entire region, corresponding to all pixels of the image sensing device 10A, of the polarizer-array device 51.

The polarizer-array device 51 is an element in which polarization regions (a first region and a second region) 51a and 51b, which have transmission axes pointing in respective two different directions, are arranged so as to correspond to the pixels of the image sensor. Specifically, the first polarization region 51a having a transmission axis inclined to a vertical direction by −45 degrees and the second polarization region 51b having a transmission axis inclined to the vertical direction by 45 degrees are alternately arranged along each of a row direction and a column direction.

The following description will discuss a case in which linearly-polarized object light and linearly-polarized reference light are caused to enter the image sensing device 10A and a case in which elliptically-polarized object light and elliptically-polarized reference light are caused to enter the image sensing device 10A.

Figure 7:
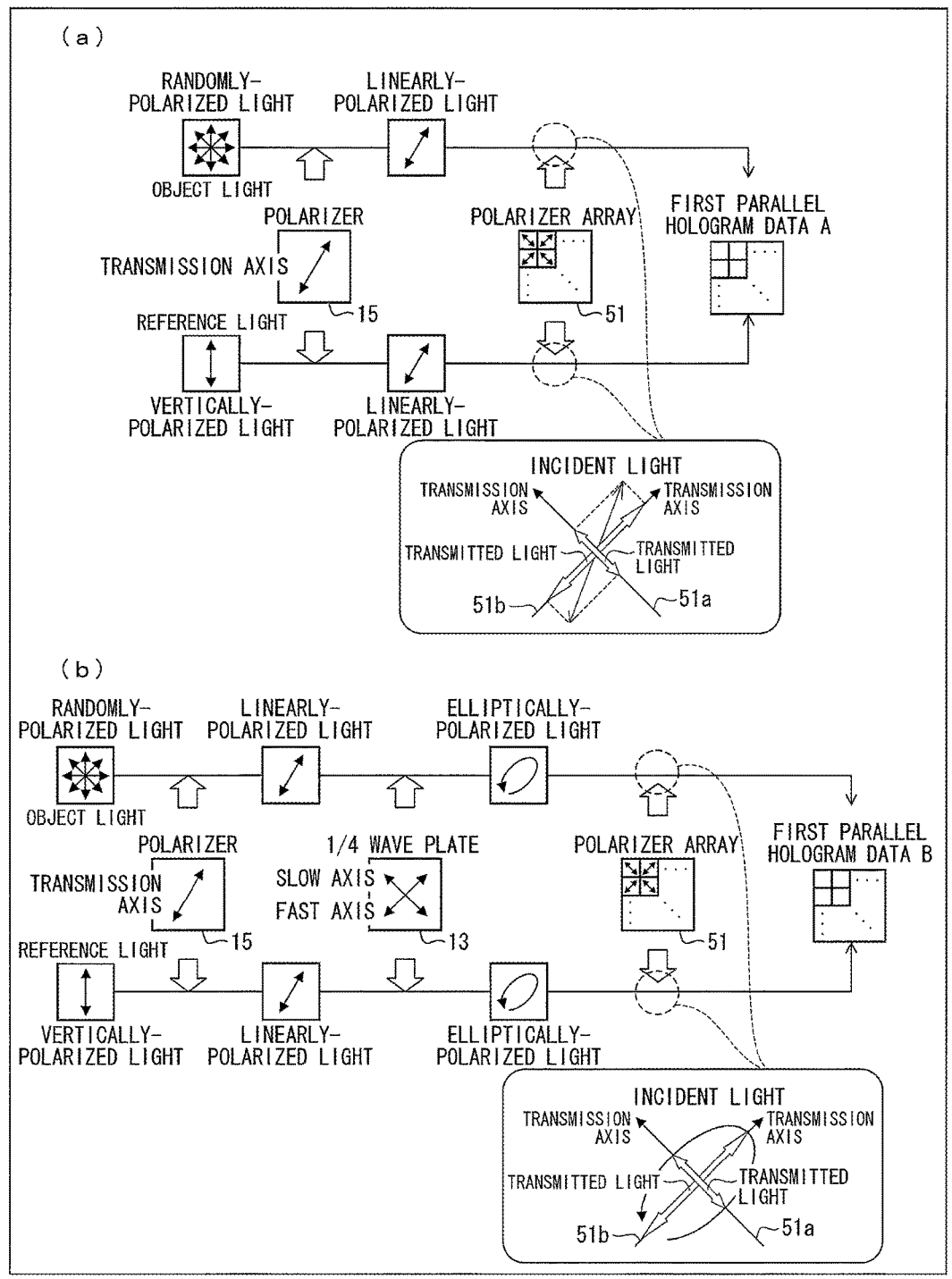
FIG. 7 is a schematic view illustrating a case in which two types of polarized object light and two types of polarized reference light are caused to enter the image sensing device in the Modified Example 1.

(a) of FIG. 7 is a schematic view illustrating a case in which linearly-polarized object light and linearly-polarized reference light are caused to enter the image sensing device in the Modified Example 1. As illustrated in (a) of FIG. 7, randomly-polarized object light and vertically-polarized reference light pass through a polarizer 15, and then pass through the polarizer-array device 51 of the image sensing device 10A, so that first parallel hologram data A is recorded. In the case where linearly-polarized object light and linearly-polarized reference light are caused to enter the image sensing device 10A, a difference between the phase-shift digital holography device in the Modified Example 1 and the phase-shift digital holography device 100 described above with reference to FIG. 1 is that the phase-shift digital holography device in the Modified Example 1 includes the polarizer 15, the polarizer-array device 51, and the image sensing device 10A. Other configurations of the phase-shift digital holography device in the Modified Example 1 are the same as those of the phase-shift digital holography device 100, and descriptions on such configurations will not be repeated in this description.

The polarizer 15 has a transmission axis that is inclined to the vertical direction by an angle, for example, within a range of more than 0 degree but less than 45 degrees. The polarizer 15 converts each of the randomly-polarized object light and the vertically-polarized reference light into linearly-polarized light.

The polarizer-array device 51 extracts light that has a component in the same direction as a transmission axis. Specifically, the polarizer-array device 51 extracts (i) light that has a component in the same direction as the transmission axis of the first polarization region 51a among the linearly-polarized object light converted by the polarizer 15 and (ii) light that has a component in the same direction as the transmission axis of the second polarization region 51b among the linearly-polarized object light. Similarly, the polarizer-array device 51 extracts (i) light that has a component in the same direction as the transmission axis of the first polarization region 51a among the linearly-polarized reference light converted by the polarizer 15 and (ii) light that has a component in the same direction as the transmission axis of the second polarization region 51b among the linearly-polarized reference light.

Note here that the polarizer 15 and the polarizer-array device 51 are configured such that the transmission axis of the polarizer 15 and the two transmission axes of the polarizer-array device 51 are adjusted, so that an angular difference between an inclination angle of the second polarization region 51b and a polarization direction of linearly-polarized light converted by the polarizer 15 is smaller than an angular difference between an inclination angle of the first polarization region 51a and a polarization direction of the linearly-polarized light converted by the polarizer 15. As such, an amount of light that passes through the second polarization region 51b among linearly-polarized object light is more than an amount of light that passes through the first polarization region 51a among the linearly-polarized object light, and an amount of light that passes through the second polarization region 51b among the linearly-polarized reference light is more than an amount of light that passes through the first polarization region 51a among the linearly-polarized reference light.

Accordingly, with use of the polarizer 15 and the polarizer-array device 51, the image sensing device 10A can generate, simultaneously in a single-shot recording, first parallel hologram data A in which pixels corresponding to different photographic exposure values are arranged. Further, by recording holograms while changing a phase shift amount with use of the piezoelectric element-driven reflecting mirror 11, the image sensing device 10A can generate the first parallel hologram data A with respect to each of a plurality of phase shift amounts.

(b) of FIG. 7 is a schematic view illustrating a case in which elliptically-polarized object light and elliptically-polarized reference light are caused to enter the image sensing device 10A in the Modified Example 1. As illustrated in (b) of FIG. 7, randomly-polarized object light and vertically polarized reference light pass through the polarizer 15 and a ¼ wave plate 13, and then pass through the polarizer-array device 51 of the image sensing device 10A, so that first parallel hologram data B is recorded. In the case where elliptically-polarized object light and elliptically-polarized reference light are caused to enter the image sensing device 10A, a difference between the phase-shift digital holography device in the Modified Example 1 and the phase-shift digital holography device 100 described above with reference to FIG. 1 is that the phase-shift digital holography device in the Modified Example 1 includes the polarizer 15, the ¼ wave plate 13, the polarizer-array device 51, and the image sensing device 10A. Other configurations of the phase-shift digital holography device in the Modified Example 1 are identical to those of the phase-shift digital holography device 100, and descriptions on such configurations will not be repeated in this description.

The ¼ wave plate 13 converts linearly-polarized light into circularly-polarized light (elliptically-polarized light) by causing incident light to have a phase difference of ¼ wavelength (π/2). The ¼ wave plate 13 has a fast axis which is inclined to the vertical direction by −45 degrees and a slow axis which is inclined to the vertical direction by 45 degrees. The polarizer 15 and the ¼ wave plate 13 are configured such that the transmission axis of the polarizer 15 and the fast axis and the slow axis of the ¼ wave plate 13 are adjusted in orientation, so that linearly-polarized object light and linearly-polarized reference light converted by the polarizer 15 are each converted by the ¼ wave plate 13 into elliptically-polarized light.

The polarizer-array device 51 extracts (i) light that has a component in the same direction as the transmission axis of the first polarization region 51a among the elliptically-polarized object light converted by the ¼ wave plate 13 and (ii) light that has a component in the same direction as the transmission axis of the second polarization region 51b among the elliptically-polarized object light. Similarly, the polarizer-array device 51 extracts (i) light that has a component in the same direction as the transmission axis of the first polarization region 51a among the elliptically-polarized reference light converted by the ¼ wave plate 13 and (ii) light that has a component in the same direction as the transmission axis of the second polarization region 51b among the elliptically-polarized reference light.

Note here that the transmission axis of the second polarization region 51b is located on a long axis of the elliptically-polarized object light and the transmission axis of the first polarization region 51a is located on a short axis of the elliptically-polarized object light. Similarly, the transmission axis of the second polarization region 51b is located on a long axis of the elliptically-polarized reference light and the transmission axis of the first polarization region 51a is located on a short axis of the elliptically-polarized reference light. As such, an amount of light that passes through the second polarization region 51b among the elliptically-polarized object light is more than an amount of light that passes through the first polarization region 51a, and an amount of light that passes through the second polarization region 51b among the elliptically-polarized reference light is more than an amount of light that passes through the first polarization region 51a.

Accordingly, with use of the polarizer 15, the ¼ wave plate 13, and the polarizer-array device 51, the image sensing device 10A can generate, simultaneously in a single-shot recording, first parallel hologram data B in which pixels corresponding to respective two different photographic exposure values are arranged. Further, by recording holograms while changing a phase shift amount with use of the piezoelectric element-driven reflecting mirror 11, the image sensing device 10A can generate the first parallel hologram data B with respect to each of a plurality of phase shift amounts.

The computer 20A (i) extracts pixels corresponding to an identical photographic exposure value from the first parallel hologram data (the first parallel hologram data A or the first parallel hologram data B) generated by the image sensing device 10A and (ii) interpolates missing pixels. In this way, second hologram data, in each of which all pixels correspond to an identical photographic exposure value, are generated with respect to each of two phase shift amounts. That is, four types of second hologram data are generated, and among the four types, (i) two types are image data that correspond to an identical phase shift amount (e.g., a phase shift amount of 0) but correspond to respective different photographic exposure values (a high photographic exposure value and a low photographic exposure value) and (ii) the other two types are image data that correspond to an identical phase shift amount (e.g., a phase shift amount of −π/2) but correspond to respective different photographic exposure values (a high photographic exposure value and a low photographic exposure value).

Further, the computer 20A generates a reconstructed image by (i) subjecting the four types of second hologram data to high dynamic range synthesis in such a manner that, for each phase shift amount, second hologram data that correspond to respective different photographic exposure values are subjected to the high dynamic range synthesis and (ii) then performing the predetermined arithmetic processing described above.

Note that in a case where linearly-polarized object light and linearly-polarized reference light are caused to enter the image sensing device 10A ((a) of FIG. 7) as described above, the ¼ wave plate 13 is unnecessary, so that a device configuration can be simplified as compared with a case in which elliptically-polarized object light and elliptically-polarized reference light are caused to enter the image sensing device 10A ((b) of FIG. 7).

Figure 8:
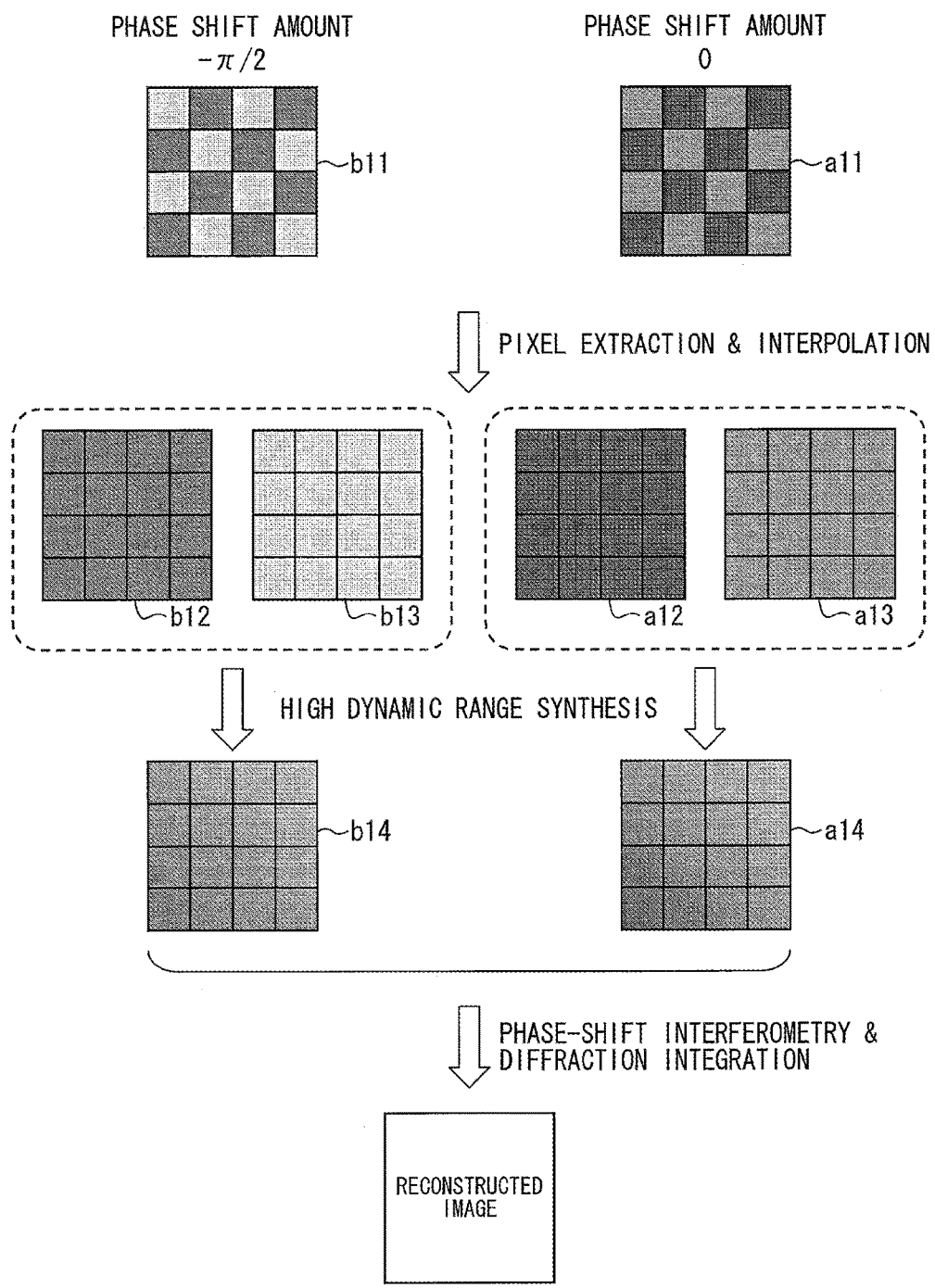
FIG. 8 is a view illustrating a flow of a process of generating a reconstructed image with use of a phase-shift digital holography device in the Modified Example 1.

FIG. 8 is a view illustrating a flow of a process of generating a reconstructed image with use of the phase-shift digital holography device in the Modified Example 1. Before and after a reflecting mirror is moved by the piezoelectric element-driven reflecting mirror 11 (see FIG. 1), the image sensing device 10A (see FIG. 6) sequentially records holograms, so that first parallel hologram data a11 corresponding to a phase shift amount of 0 and first parallel hologram data b11 corresponding to a phase shift amount of −π/2 are generated.

The first parallel hologram data a11 corresponding to the phase shift amount of 0 is image data in which two types of pixels corresponding to respective different photographic exposure values are arranged. From the first parallel hologram data a11 corresponding to the phase shift amount of 0, each of the two types of pixels, that is, pixels that correspond to each of the different photographic exposure values are extracted, and missing pixels are interpolated. In this way, two types of second hologram data a12 and a13, in each of which all pixels correspond to an identical photographic exposure value, are generated. Further, the second hologram data a12 and a13 are subjected to high dynamic range synthesis, so that second synthesized hologram data a14 corresponding to the phase shift amount of 0 is generated.

Similarly, the parallel hologram data b11 corresponding to the phase shift amount of −π/2 is image data in which two types of pixels corresponding to respective different photographic exposure values are arranged. From the first parallel hologram data b11 corresponding to the phase shift amount of −π/2, each of the two types of pixels, that is, pixels that correspond to each of the different photographic exposure values are extracted, and missing pixels are interpolated. In this way, two types of second hologram data b12 and b13, in each of which all pixels correspond to identical photographic exposure value, are generated. Further, the second hologram data b12 and b13 are subjected to high dynamic range synthesis, so that second synthesized hologram data b14 corresponding to the phase shift amount of −π/2 is generated. Further, on the basis of the second synthesized hologram data a14 and b14, a reconstructed image is generated by the predetermined arithmetic processing described above.

Modified Example 2: Another Phase-Shift DH Device of Simultaneous Recording Type A phase-shift digital holography device in a Modified Example 2 uses means for causing a photographic exposure value to vary from pixel to pixel, so that the phase-shift digital holography device records, simultaneously in a single-shot recording, a hologram obtained with use of a photographic exposure value that varies from pixel to pixel. The means is, however, different from the means in the Modified Example 1. Note that the phase-shift digital holography device in the Modified Example 2 differs the phase-shift digital holography device 100, described with reference to FIG. 1, in the First Embodiment in that the image sensing device 10 is replaced with an image sensing device 10B (see FIG. 9). Configurations and functions of the phase-shift digital holography device in the Modified Example 2 other than the image sensing device 10B are the same with those of the phase-shift digital holography device 100, and the following description will therefore mainly discuss a difference between the phase-shift digital holography device in the Modified Example 2 and the phase-shift digital holography device 100.

Figure 9:
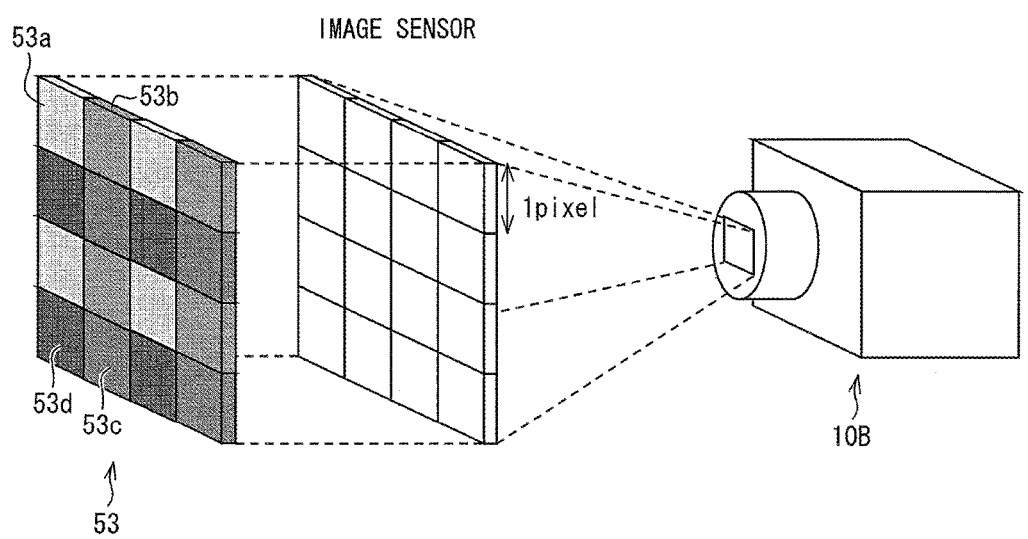
FIG. 9 is a view illustrating an image sensing device in a Modified Example 2.

FIG. 9 is a view illustrating an image sensing device in the Modified Example 2. As illustrated in FIG. 9, the image sensing device 10B includes a neutral density filter array device 53 attached to an image sensor plane of the image sensing device 10B. Note that for easy explanation, FIG. 9 shows a structure of a partial region of the neutral density filter array device 53 instead of an entire region, corresponding to all pixels of the image sensing device 10B, of the neutral density filter array device 53.

The neutral density filter array device 53 is an element in which four types of neutral density filter regions 53a through 53d, which have respective different transmissivities, are arranged. Specifically, the filter region 53a having a transmissivity T1 and the filter region 53b having a transmissivity T2 are alternately arranged along a row direction, and the filter region 53c having a transmissivity T3 and the filter region 53d having a transmissivity T4 are arranged along the row direction. The filter region 53a and the filter region 53d are arranged alternately along a column direction, and the filter region 53b and the filter region 53c are arranged alternately along the column direction.

Accordingly, reference light and object light that pass through the neutral density filter array device 53 are converted to a hologram in which four types of photographic exposure values are used on a pixel-by-pixel basis. Accordingly, the image sensing device 10B can generate, simultaneously in a single-shot recording, second parallel hologram data in which pixels that correspond to respective four types of photographic exposure values are arranged. Further, by recording holograms while changing a phase shift amount with use of the piezoelectric element-driven reflecting mirror 11 (see FIG. 1), the image sensing device 10B can generate the second parallel hologram data with respect to each of a plurality of phase shift amounts.

Note that in a case where the neutral density filter array device has two types of regions that have respective different transmissivities, the neutral density filter array device can obtain first parallel hologram data in which two types of pixels are arranged, as in the Modified Example 1.

Second Embodiment: Parallel Phase-Shift DH Device

A Second Embodiment will describe an example in which the present invention is applied to a parallel phase-shift DH device.

(Parallel Phase-Shift DH Device of Sequential Recording Type)

Figure 10:
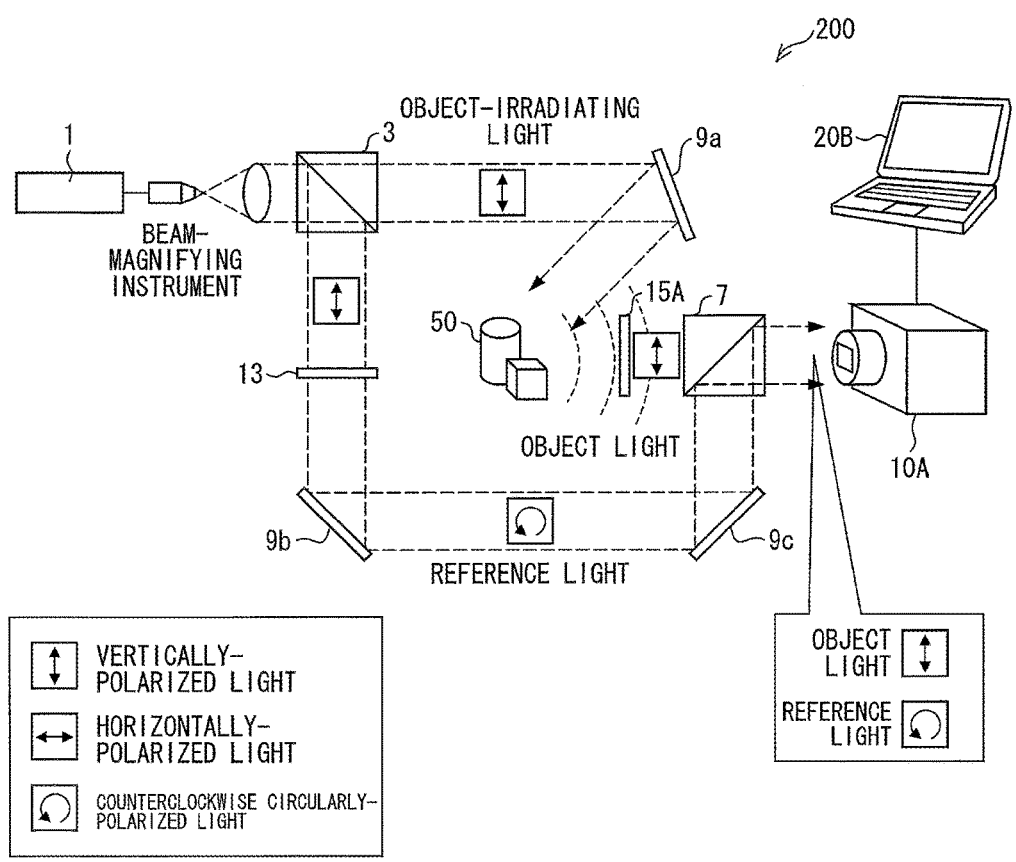
FIG. 10 is a view illustrating an example of a digital holography device in a Second Embodiment.

FIG. 10 is a view illustrating an example of a digital holography device in the Second Embodiment of the present invention. As illustrated in FIG. 10, a parallel two-step phase-shift digital holography device 200, which is an example of the digital holography device, includes a laser 1, a beam splitter element 3, a beam-combining element 7, mirrors 9a through 9c, an image sensing device 10A, a ¼ wave plate 13, a polarizer 15A, and a computer 20B.

Laser light emitted from the laser 1 enters the beam splitter element 3 through a beam-magnifying instrument, and the beam splitter element 3 causes the laser light emitted from the laser 1 and having entered the beam splitter element 3 to be split in two directions. Laser light (object-irradiating light) that is one of laser light (vertically-polarized light) thus split by the beam splitter element 3 in the two directions is reflected from the mirror 9a, and is applied to an object 50. The laser light applied to the object 50 passes through the beam-combining element 7 via the polarizer 15A so as to enter an image sensor plane of the image sensing device 10A as object light (vertically-polarized light).

On the other hand, laser light (reference light) that is the other one of the laser light (vertically-polarized light) thus split by the beam splitter element 3 in the two directions passes through the ¼ wave plate 13 and then is reflected from the mirror 9b. The light thus reflected from the mirror 9b passes through the beam-combining element 7 and enters the image sensor plane of the image sensing device 10A as circularly-polarized reference light. The ¼ wave plate 13 converts linearly-polarized light into circularly-polarized light by causing the linearly-polarized light to have a phase difference of ¼ wavelength ($\pi/2$). In this case, the reference light is converted into counterclockwise circularly-polarized light.

Figure 11:
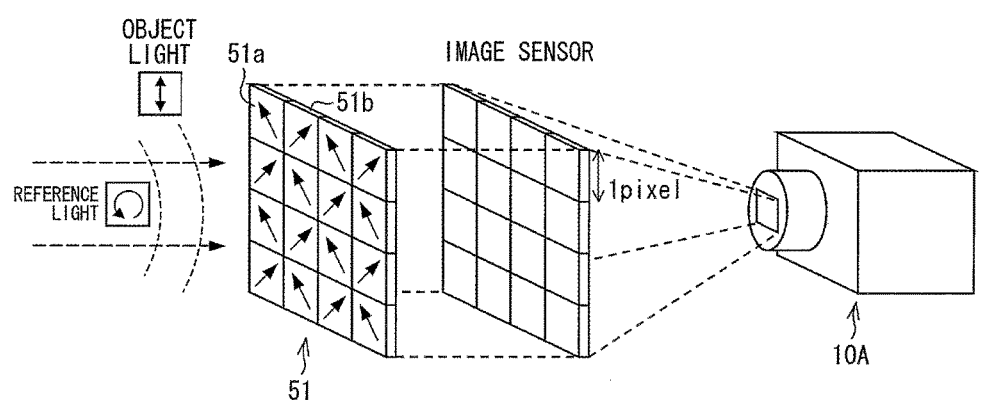
FIG. 11 is a view illustrating an example of an image sensing device in the Second Embodiment.

FIG. 11 is a view illustrating an example of an image sensing device in the Second Embodiment. As illustrated in FIG. 11, the polarizer-array device 51 is attached to the image sensor plane of the image sensing device 10A. Further, as described above, reference light passes through the ¼ wave plate 13. As such, vertically polarized object light and counterclockwise circularly-polarized reference light enter the polarizer-array device 51 of the image sensing device 10A.

When the counterclockwise circularly-polarized reference light passes through the polarizer-array device 51, the polarizer-array device 51 extracts, for each pixel, reference light having a phase shift amount of 0 and reference light having a phase shift amount of $-\pi/2$. The reference light having the phase shift amount of 0 and the reference light having the phase shift amount of $-\pi/2$, which have been extracted by the polarizer-array device 51, and the object light interfere with each other on the image sensor plane of the image sensing device 10A. This causes an interference pattern of the phase shift amount of 0 and an interference pattern of the phase shift amount of $-\pi/2$ to be formed on the image sensor plane. Accordingly, in a case where the interference patterns are recorded by the image sensing device 10A a plurality of times sequentially over respective different lengths of photographic exposure time, first parallel phase hologram data in which pixels corresponding to the phase shift amount of 0 are arranged and first parallel phase hologram data in which pixels corresponding to the phase shift amount of $-\pi/2$ are arranged are generated for each of different photographic exposure values.

The computer 20B subjects a plurality of first parallel phase hologram data generated by the image sensing device 10A to high dynamic range synthesis to thereby generate first synthesized parallel phase hologram data. Further, the computer 20B extracts pixels corresponding to each identical phase shift amount from the first synthesized parallel phase hologram data, and interpolates missing pixels. In this way, third hologram data, in each of which all pixels correspond to an identical phase shift amount, are generated. That is, third hologram data in which all pixels correspond to a phase shift amount of 0 and third hologram data in which all pixels correspond to a phase shift amount of $-\pi/2$ are generated. The computer 20B generates a reconstructed image by performing predetermined arithmetic processing on third hologram data corresponding to each of different phase shift amounts.

Modified Example 3: Parallel Phase-Shift DH Device of Simultaneous Recording Type The parallel two-step phase-shift digital holography device 200 in the Second Embodiment generates, in a single-shot recording, two pieces of first parallel phase hologram data such that pixels corresponding to two types of phase shift amounts (0, $-\pi/2$) are arranged in the respective two pieces of first parallel phase hologram data. A parallel two-step phase-shift digital holography device in a Modified Example 3 generates, in a single-shot recording, second parallel phase hologram data in which pixels corresponding to combinations among four types of photographic exposure values and two types of phase shift amounts (0, $-\pi/2$) are arranged. Specifically, the parallel two-step phase-shift digital holography device in the Modified Example 3 is configured such that the neutral density filter array device 53 (see FIG. 9) is provided on a front surface side of the polarizer-array device 51 of the image sensing device 10A of the parallel two-step phase-shift digital holography device 200, illustrated in FIG. 10, in the Second Embodiment.

Figure 12:
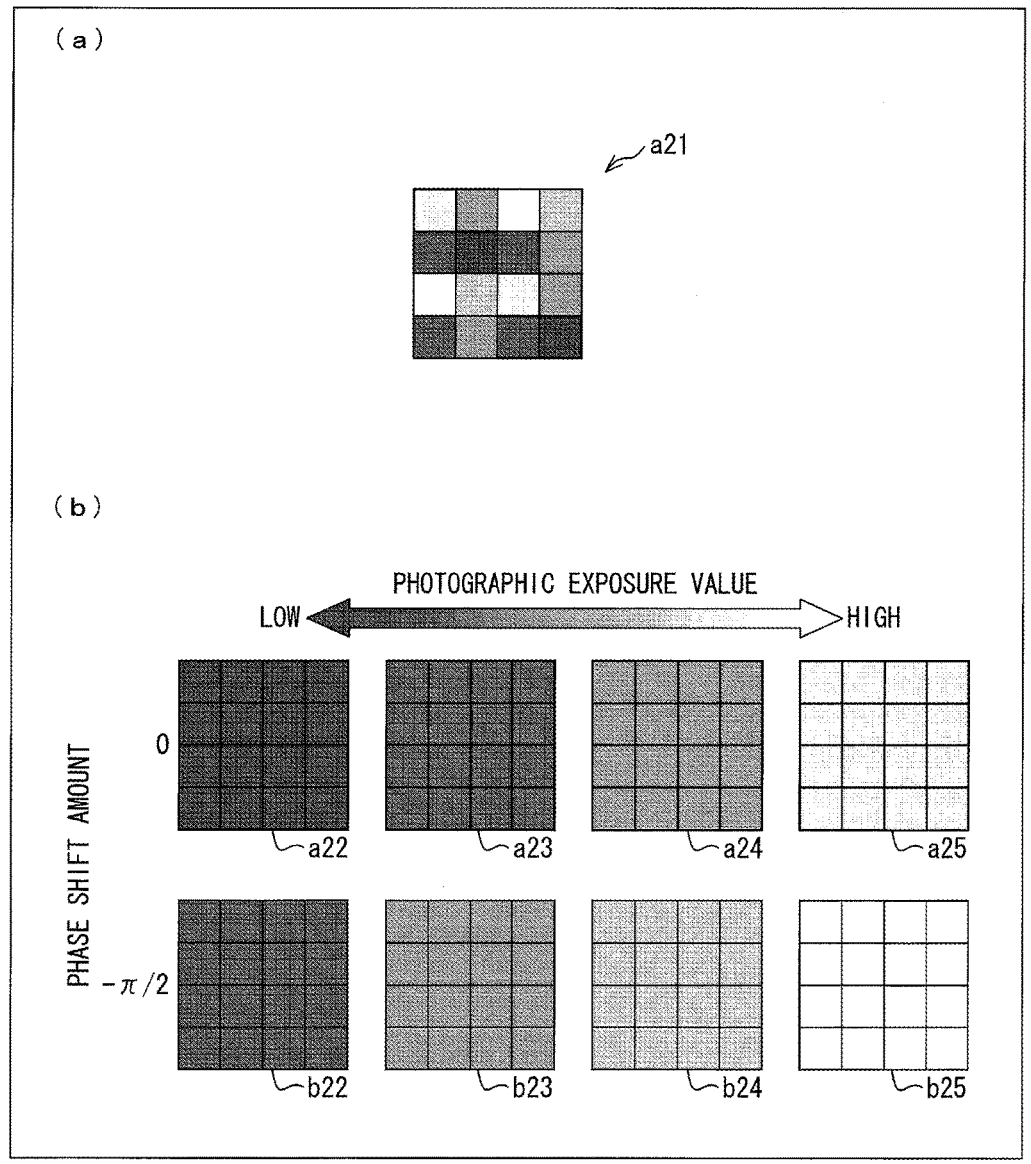
FIG. 12 is a view illustrating an example of second parallel phase hologram data.

(a) and (b) of FIG. 12 are views illustrating an example of the second parallel phase hologram data. As illustrated in (a) and (b) of FIG. 12, second parallel phase hologram data a21 is data in which eight types of pixels, which correspond to combinations among two types of phase shift amounts (0, $-\pi/2$) and four types of photographic exposure values, are arranged. From the second parallel phase hologram data a21, each of the eight types of pixels, that is, pixels that correspond to each combination of a phase shift amount and a photographic exposure value are extracted, and missing pixels are interpolated in each of the eight types of pixels thus extracted. This causes eight types of hologram data a22 through a25 and b22 through b25 to be generated. Further, for each phase shift amount, high dynamic range synthesis is performed with use of hologram data that correspond to respective different photographic exposure values (the hologram data a22 through 25, which correspond to respective different photographic exposure values, are used for the phase shift amount of 0, and the hologram data b22 through 25, which correspond to respective different photographic exposure values, are used for the phase shift amount of $-\pi/2$). Then, the predetermined arithmetic processing described above is performed, so that a reconstructed image is generated.

Figure 13:
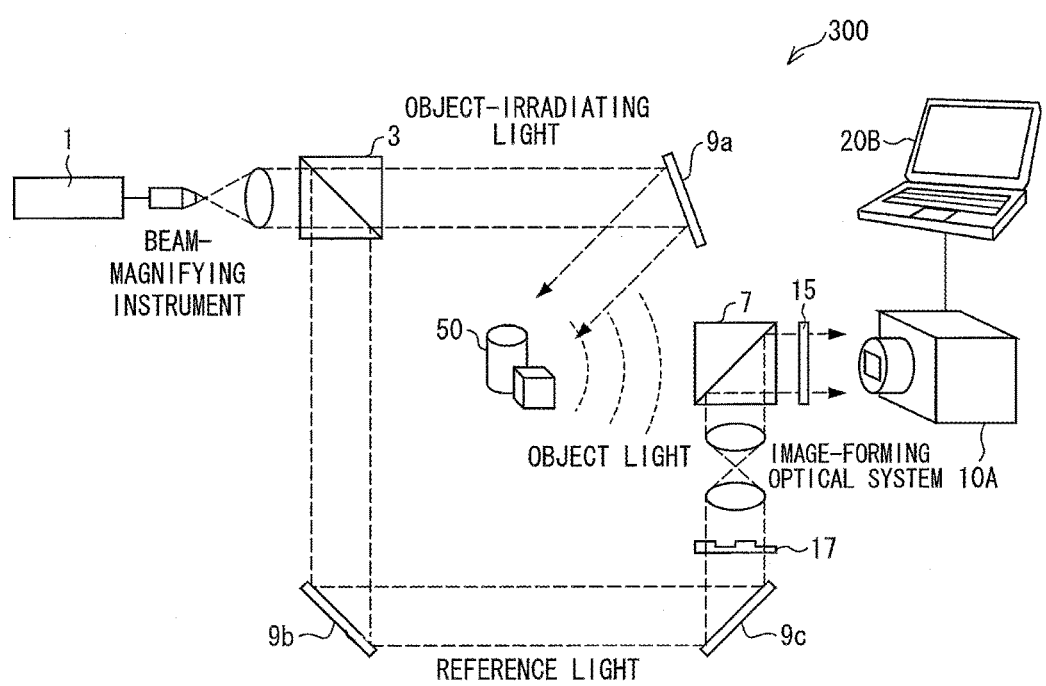
FIG. 13 is a view illustrating an example of a parallel two-step phase-shift digital holography device in a Modified Example 4.

Modified Example 4: Another Parallel Phase-Shift DH Device of Simultaneous Recording Type A parallel two-step phase-shift digital holography device in a Modified Example 4 generates, in a single-shot recording, parallel phase hologram data in which eight types of pixels, which correspond to combinations among two types of phase shift amounts and four types of photographic exposure values, are arranged. The parallel two-step phase-shift digital holography device in the Modified Example 4, however, has a configuration different from that of the parallel two-step phase-shift digital holography device in the Modified Example 3. FIG. 13 is a view illustrating an example of the parallel two-step phase-shift digital holography device in the Modified Example 4. As illustrated in FIG. 13, a parallel two-step phase-shift digital holography device 300 includes a laser 1, a beam splitter element 3, a beam-combining element 7, mirrors 9a through 9c, a phase-delaying element array (phase-shift section) 17, a polarizer 15, an image sensing device 10A, and a computer 20B.

Laser light emitted from the laser 1 enters the beam splitter element 3 through a beam-magnifying instrument, and the beam splitter element 3 causes the laser light emitted from the laser 1 and having entered the beam splitter element 3 to be split in two directions (object-irradiating light and reference light). Laser light (object-irradiating light) that is one of laser light thus split by the beam splitter element 3 in the two directions is reflected from the mirror 9a, and is applied to an object 50. The laser light applied to the object 50 passes through the beam-combining element 7 and then passes through the polarizer 15A so as to enter an image sensor plane of the image sensing device 10A as object light. When the object light passes through the polarizer 15, the object light is converted into linearly-polarized light.

On the other hand, laser light (reference light) that is the other one of the laser light thus split by the beam splitter element 3 in the two directions is reflected from the mirror 9b and is then reflected by the mirror 9c. The laser light thus reflected by the mirror 9c passes through the phase-delaying element array 17, and then passes through the beam-combining element 7 via an image-forming optical system. Further, the later light is converted into linearly-polarized light by passing through the polarizer 15, and enters the image sensor plane of the image sensing device 10A as reference light. Note that the polarizer-array device 51 is attached to the image sensor plane of the image sensing device 10A as illustrated in FIG. 6.

Note that the description above has discussed an example case in which linearly-polarized reference light and linearly-polarized object light are caused to interfere with each other on the image sensor plane of the image sensing device 10A, but it is also possible to cause circularly-polarized (elliptically-polarized) reference light and circularly-polarized (elliptically-polarized) object light to interfere with each other. In this case, the ¼ wave plate 13 is provided between the polarizer 15 and the polarizer-array device 51.

Note that also in the Modified Example 3, the ¼ wave plate 13 is unnecessary in a case where linearly-polarized object light and linearly-polarized reference light are caused to enter the image sensing device 10A, as in the Modified Example 1. Accordingly, a device configuration can be simplified in this case as compared with a case in which elliptically-polarized object light and elliptically-polarized reference light are caused to enter the image sensing device 10A.

Figure 14:
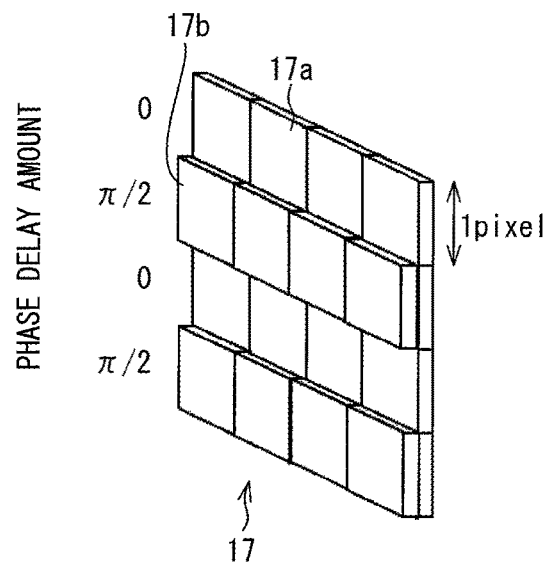
FIG. 14 is a view illustrating an example of a configuration of a phase-delaying element array.

FIG. 14 is a view illustrating an example of a configuration of a phase-delaying element array. Note that for easy explanation, FIG. 14 shows a structure of a partial region of the phase-delaying element array 17 instead of a structure of an entire region, corresponding to all pixels of the image sensing device 10A, of the phase-delaying element array 17. As illustrated in FIG. 14, the phase-delaying element array 17 includes two types of phase-delaying elements 17a and 17b which are arranged along a row direction and a column direction. Specifically, a first delay region, in which a plurality of phase-delaying elements 17a are arranged along the row direction and a second delay region, in which a plurality of phase-delaying elements 17b are arranged along the row direction are alternately arranged along the column direction.

Figure 15:
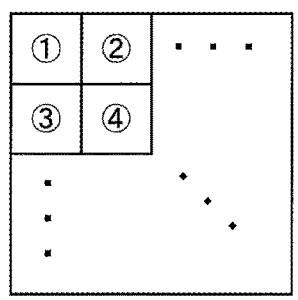
FIG. 15 is a view illustrating third parallel phase hologram data recorded by an image sensing device in the Modified Example 4.

The two types of phase-delaying elements 17a and 17b can be realized by using a transparent material, such as glass, that has no dependency on polarization and changing a thickness of the transparent material. The phase-delaying element 17a, which has the smaller thickness, has a phase delay amount of 0 and the phase-delaying element 17b, which has the larger thickness, has a phase delay amount of $\pi/2$. Accordingly, as illustrated in FIG. 15, third parallel phase hologram data that includes four types of pixels, which correspond to combinations among two types of phase shift amounts and two types of photographic exposure values, is generated by the image sensing device 10A.

Note that the description above has discussed an example case in which the phase-delaying element array 17 is provided, but it is possible to employ a configuration in which a spatial light modulator is provided in place of the phase-delaying element array 17.

Figure 16:
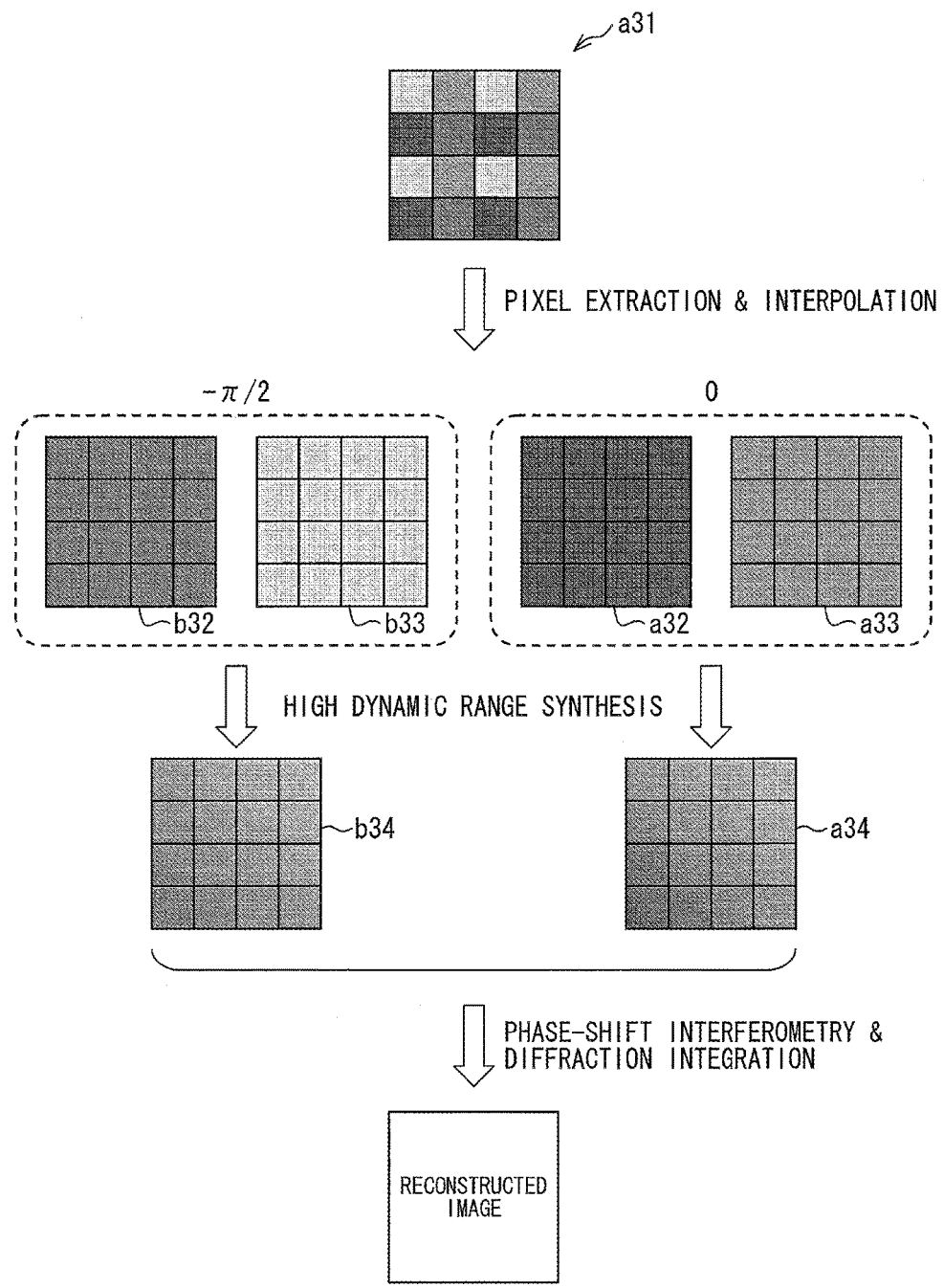
FIG. 16 is a view illustrating a flow of a process of generating a reconstructed image with use of the parallel two-step phase-shift digital holography device in the Modified Example 4.

FIG. 16 is a view illustrating a flow of a process of generating a reconstructed image with use of the parallel two-step phase-shift digital holography device in the Modified Example 4. As illustrated in FIG. 16, third parallel phase hologram data a31 (a different-photographic-exposure-value-simultaneously-recorded hologram) generated by the parallel two-step phase-shift digital holography device 300 (see FIG. 13) includes four types of pixels which correspond to combinations among two types of phase shift amounts and two types of photographic exposure values. From the third parallel phase hologram data a31, each of the four types of pixels, that is, pixels that correspond to each combination of a phase shift amount and a photographic exposure value are extracted, and missing pixels are interpolated in each of the four types of pixels. This causes four types of fourth hologram data a32, a33, b32, and b33 to be generated. Further, the four types of fourth hologram data a32, a33, b32, and b33 are subjected to high dynamic range synthesis in such a manner that, for each phase shift amount, fourth hologram data that corresponding to respective different photographic exposure values are subjected to high dynamic range synthesis. In this way, third synthesized hologram data a34 that corresponds to a phase shift amount of 0 and third synthesized hologram data b34 that corresponds to a phase shift amount $-\pi/2$ are generated. Further, predetermined arithmetic processing is performed on the third synthesized hologram data a34 and b34, so that a reconstructed image is generated.

Figure 17:
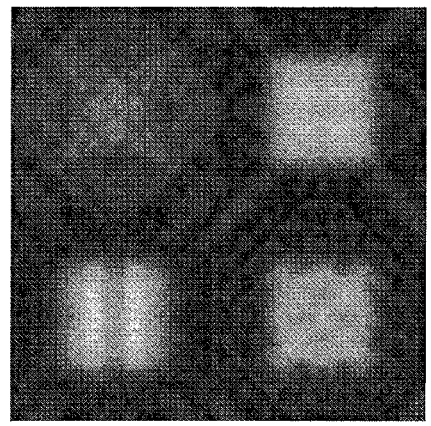
FIG. 17 is a first view illustrating a result obtained in a case where a reconstructed image generated by the parallel two-step phase-shift digital holography device in the Modified Example 4 is generated by computer simulation.
Figure 17:
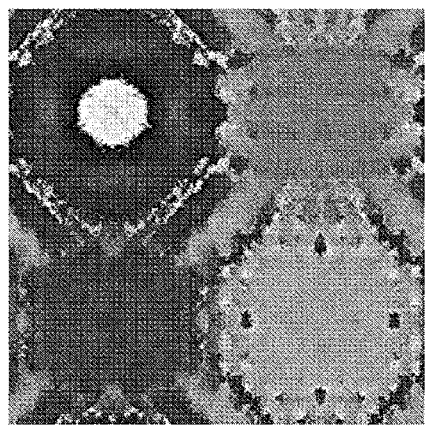
Figure 18:
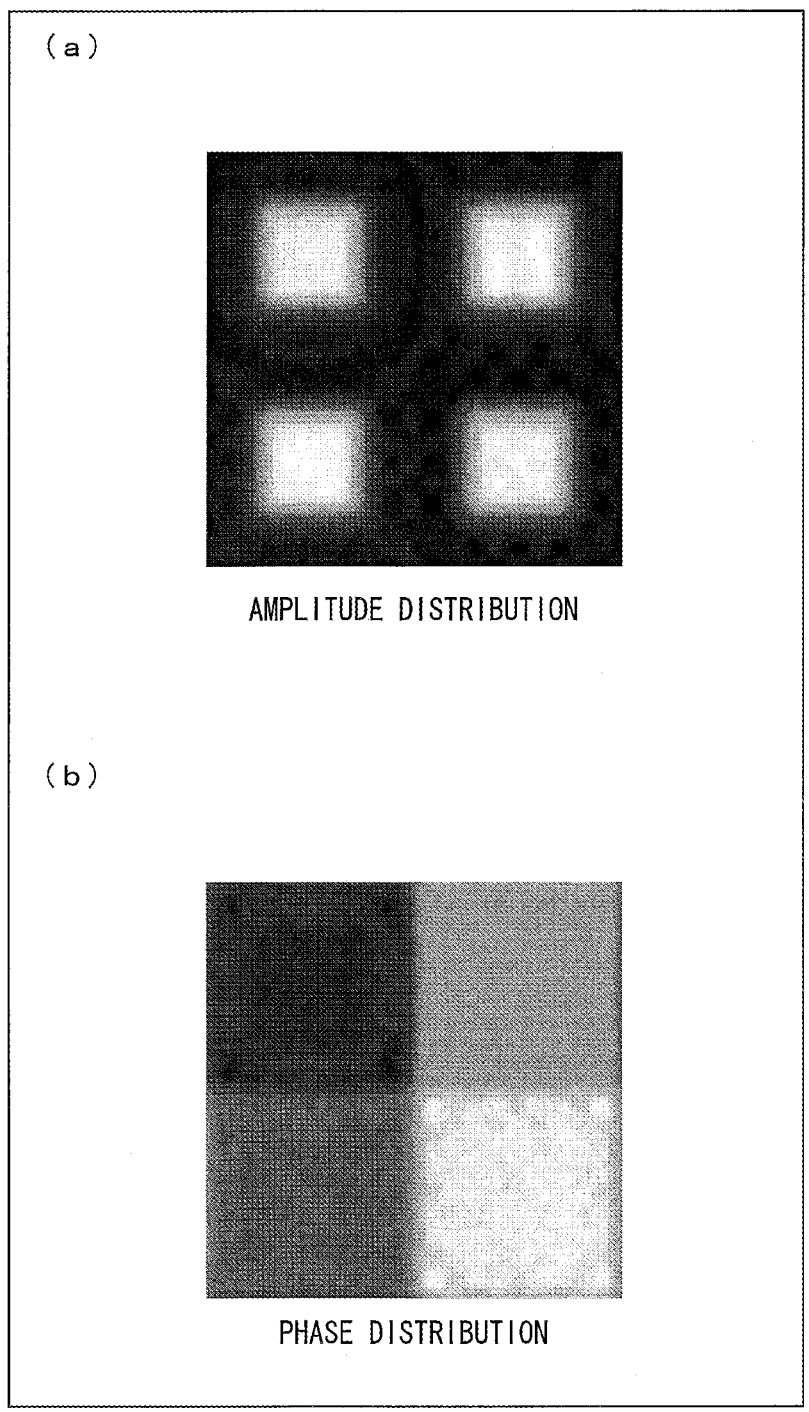
FIG. 18 is a second view illustrating a result obtained in a case where a reconstructed image generated by the parallel two-step phase-shift digital holography device in the Modified Example 4 is generated by computer simulation.

FIGS. 17 and 18 each illustrate a result obtained in a case where a reconstructed image generated by the parallel two-step phase-shift digital holography device in the Modified Example 4 was generated by computer simulation. Note that parameters used in the computer simulation are shown in FIG. 28. (a) and (b) of FIG. 17 illustrate a reconstructed image generated in a case where high dynamic range synthesis was not applied, and (a) and (b) of FIG. 18 illustrate a reconstructed image generated in a case where high dynamic range synthesis was applied.

As shown in FIG. 17, deterioration in image quality is observed both in an amplitude distribution and a phase distribution in the case where high dynamic range synthesis was not applied. Particularly in the phase distribution, a boundary between a bright portion and a dark portion is difficult to recognize. On the other hand, as shown in FIG. 18, in the case where high dynamic range synthesis was applied, an image having an amplitude distribution and a phase distribution similar to those of the object 50 illustrated in (a) and (b) of FIG. 3 was successfully generated. Particularly in the phase distribution, a boundary between a bright portion and a dark portion is easier to recognize, as opposed to the boundary that is difficult to recognize in the reconstructed image generated in the case where high dynamic range synthesis was not applied. Therefore, in contrast to the case where high dynamic range synthesis was not applied, an improved image quality is observed in the reconstructed image in the case where high dynamic range synthesis was applied.

Figure 19:
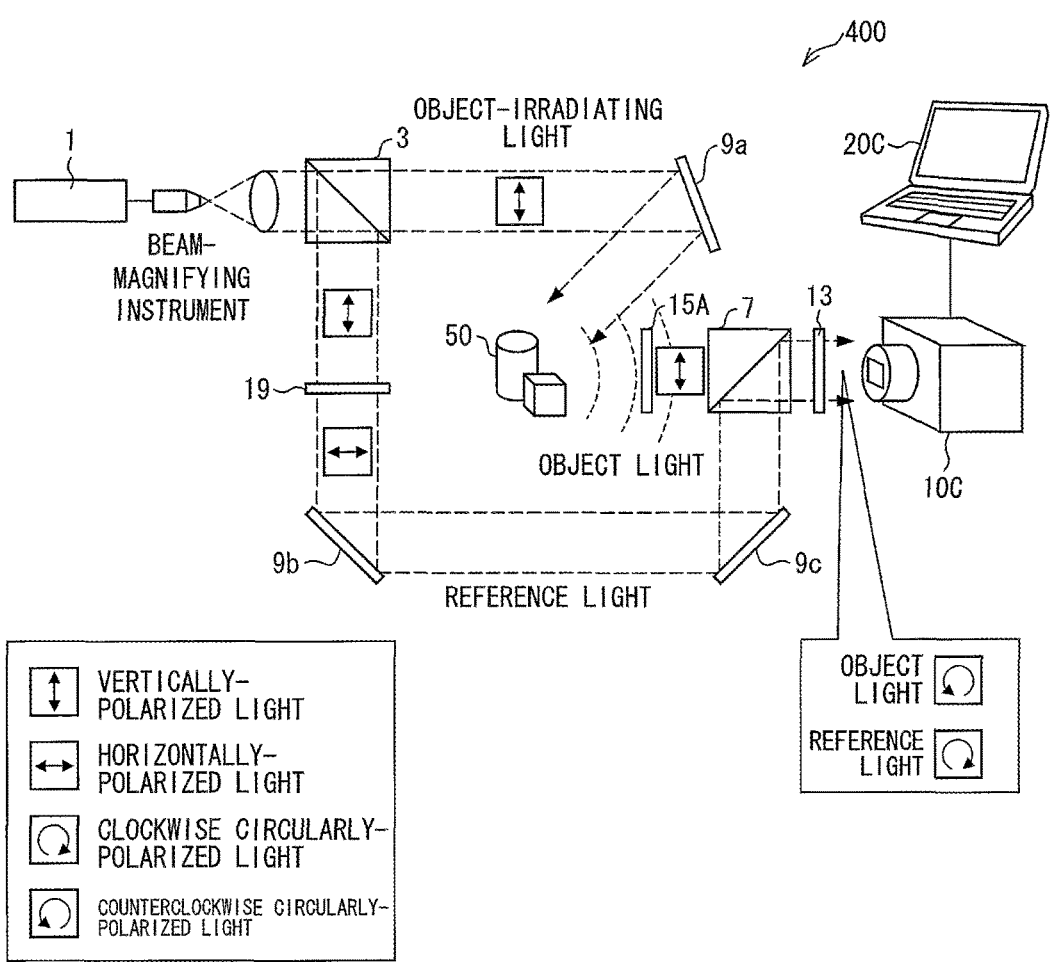
FIG. 19 is a view illustrating an example of a parallel four-step phase-shift digital holography device in a Modified Example 5.

Modified Example 5: Still Another Parallel Phase-Shift DH Device of Simultaneous Recording Type FIG. 19 is a view illustrating an example of a parallel four-step phase-shift digital holography device in a Modified Example 5. As illustrated in FIG. 19, a parallel four-step phase-shift digital holography device 400 includes a laser 1, a beam splitter element 3, a beam-combining element 7, mirrors 9a through 9c, a ¼ wave plate 13, a ½ wave plate 19, a polarizer 15A, an image sensing device 10C, and a computer 20C.

Laser light emitted from the laser 1 enters the beam splitter element 3 through a beam-magnifying instrument, and the beam splitter element 3 causes the laser light emitted from the laser 1 and having entered the beam splitter element 3 to be split in two directions. Laser light (object-irradiating light) that is one of laser light (vertically-polarized light) thus split by the beam splitter element 3 in the two directions is reflected from the mirror 9a, and is applied to an object 50. The laser light applied to the object 50 passes through the polarizer 15A, the beam-combining element 7, and the ¼ wave plate 13 in this order and enters an image sensor plane of the image sensing device 10C as object light (vertically-polarized light) at an angle perpendicular to the image sensor plane.

On the other hand, laser light (reference light) that is the other one of the laser light (vertically-polarized light) thus split by the beam splitter element 3 is applied to the mirror 9b via the ½ wave plate 19, and the laser light (horizontally-polarized) thus applied is reflected from the mirror 9c so as to pass through the beam-combining element 7 and the ¼ wave plate 13 in this order. The laser light then enters the image sensor plane of the image sensing device 10C as reference light at an angle perpendicular to the image sensor plane.

The ½ wave plate 19 is a wave plate which causes incident light to have a phase difference of ½ wavelength ($\pi/2$). This causes the vertically polarized laser light to be converted into horizontally-polarized light. The ¼ wave plate 13 is, as described above, a wave plate which causes incident light to have a phase difference of ¼ wavelength ($\pi/2$). This causes the vertically polarized object light to be converted into counterclockwise circularly-polarized light, and causes the horizontally-polarized reference light to be converted into clockwise circularly-polarized light.

Figure 20:
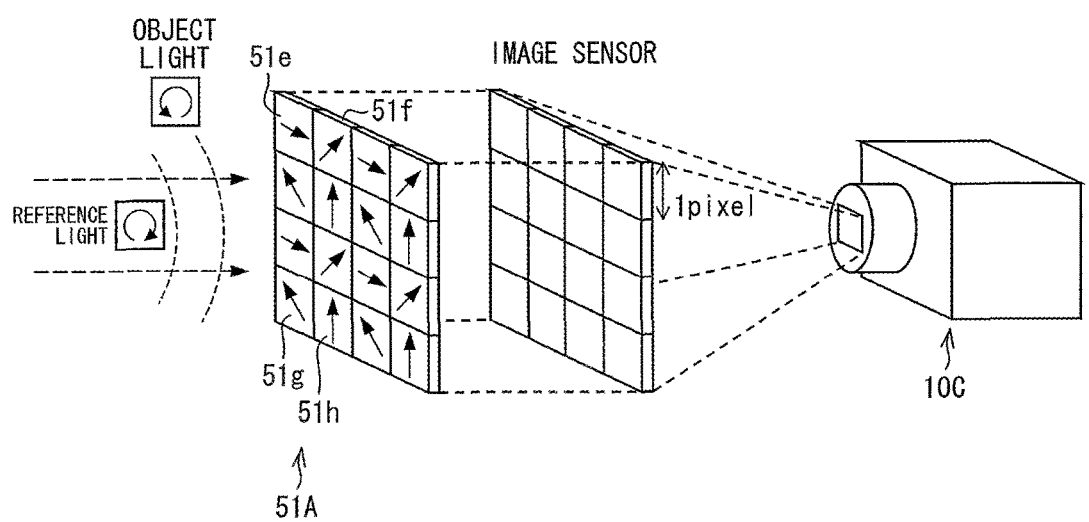
FIG. 20 is a view illustrating an image sensing device in the Modified Example 5.

FIG. 20 illustrates an image sensing device in the Modified Example 5. As illustrated in FIG. 20, the image sensing device 10C includes a polarizer-array device 51A attached to the image sensor plane of the image sensing device 10C. Note that for easy explanation, FIG. 20 shows a structure of a partial region of the polarizer-array device 51A instead of a structure of an entire region, corresponding to all pixels of the image sensing device 10C, of the polarizer-array device 51A.

The polarizer-array device 51A is an element in which polarization regions 51e, 51f, 51g, and 51h, which have transmission axes pointing in respective four different directions, are arranged so as to correspond to the pixels of the image sensor. The polarization region 51e has a transmission axis pointing in a horizontal direction, the polarization region 51f has a transmission axis inclined to a vertical direction by 45 degrees, the polarization region 51g has a transmission axis inclined to the vertical direction by −45 degrees, and the polarization region 51h has a transmission axis pointing in the vertical direction.

In the polarizer-array device 51A, the polarization region 51e and the polarization region 51f are alternately arranged along a row direction, and the polarization region 51g and the polarization region 51h are alternately arranged along the row direction. The polarization region 51e and the polarization region 51g are alternately arranged along a column direction, and the polarization region 51f and the polarization region 51h are alternately arranged along the column direction.

As described above, the reference light passes through the ¼ wave plate 13 and the ½ wave plate 19. As such, the object light (counterclockwise circularly-polarized) and the reference light (clockwise circularly-polarized) enter the polarizer-array device 51A of the image sensing device 10C.

When object light (counterclockwise circularly-polarized light) having phase shift amounts of 0, $\pi/4$, $\pi/2$, and $3\pi/4$ and reference light (clockwise circularly-polarized) having phase shift amounts of 0, $-\pi/4$, $-\pi/2$, and $-3\pi/4$ passes through the polarizer-array device 51A, the polarizer-array device 51A extracts (i) object light having a phase shift amount of 0 and reference light having a phase shift amount of 0 in the polarization region 51e, (ii) object light having a phase shift amount of $\pi/4$ and reference light having a phase shift amount $-\pi/4$ in the polarization region 51f, (iii) object light having a phase shift amount of $\pi/2$ and reference light having a phase shift amount of $-\pi/2$ in the polarization region 51h, and (iv) object light having a phase shift amount of $3\pi/4$ and reference light having a phase shift amount of $-3\pi/4$ in the polarization region g. The reference light and the object light which have been extracted by the polarizer-array device 51A interfere with each other on the image sensor plane of the image sensing device 10C. Accordingly, fourth parallel phase hologram data that includes pixels corresponding to phase shift amounts of 0, $-\pi/2$, $-\pi$, and $-3\pi/2$ is generated by the image sensing device 10C in a single-shot recording. Further, the image sensing device 10C records holograms sequentially over respective different lengths of photographic exposure time to thereby generate a plurality of fourth parallel phase hologram data corresponding to respective different photographic exposure values.

The computer 20C subjects the plurality of fourth parallel phase hologram data, which have been generated by the image sensing device 10C, to high dynamic range synthesis to thereby generate second synthesized parallel phase hologram data. Further, the computer 20C extracts pixels corresponding to each identical phase shift amount from the second synthesized parallel phase hologram data, and interpolates missing pixels. In this way, fifth hologram data corresponding to respective different phase shift amounts are generated. The computer 20C generates a reconstructed image by performing predetermined arithmetic processing on the fifth hologram data corresponding to the respective different phase shift amounts.

As described above, the computer 20C generates a reconstructed image by a process flow different from the process flow of each of the computers 20, 20A, and 20B. The process flow employed by the computer 20C makes it possible to reduce the number of calculations (calculation amount) and improve estimation accuracy in estimating a camera response function, as compared with the process flow of each of the computers 20, 20A, and 20B.

Details of the reduction in the number of calculations (calculation amount) are as follows. In a case where a plurality of fourth parallel phase hologram data are subjected to high dynamic range synthesis in accordance with the process flow of each of the computers 20, 20A, and 20B, the calculation of the high dynamic range synthesis is performed four times (=the number of times of changing a phase shift amount) in total. In contrast, according to the process flow of the computer 20C, the calculation of the high dynamic range synthesis needs to be performed only once, so that the number of calculations can be reduced.

Details of the improvement in estimation accuracy in estimating the camera response function are as follows. Since missing pixels are interpolated after the high dynamic range synthesis is performed, it is possible to perform the high dynamic range synthesis before interpolation error occurs from the interpolation of missing pixels. This allows an improvement in estimation accuracy. Accordingly, it is possible to prevent generation of a high dynamic range hologram that is different from a desired interference pattern to be obtained by the high dynamic range synthesis. As a result, an image quality of a reconstructed image can be further improved.

Figure 21:
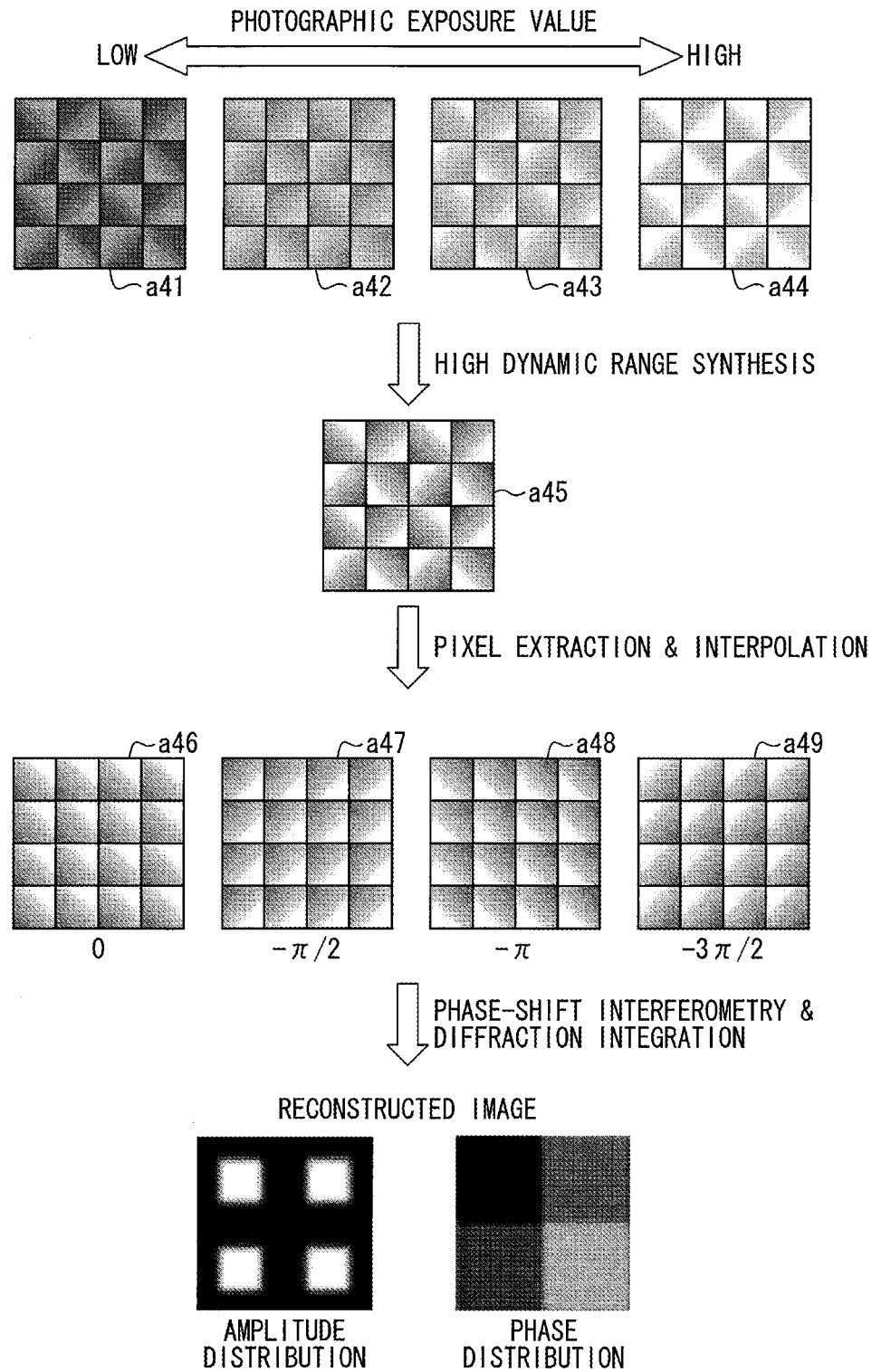
FIG. 21 is a view illustrating a flow of a process of generating a reconstructed image with use of the parallel four-step phase-shift digital holography device in the Modified Example 5.

FIG. 21 is a view illustrating a flow of a process of generating a reconstructed image with use of the parallel four-step phase-shift digital holography device in the Modified Example 5. As illustrated in FIG. 21, the image sensing device 10C (see FIG. 19) records fourth parallel phase hologram data, i.e., holograms a41 through a44. Note that among the holograms a41 through a44, a photographic exposure value increases as a reference sign has a greater number. The fourth parallel phase hologram data, i.e., the holograms a41 through a44 are subjected to high dynamic range synthesis, pixels that correspond to respective four types of phase shift amounts are extracted, and missing pixels are interpolated. This causes four types of fourth synthesized hologram data a46 through a49 to be generated. Predetermined arithmetic processing is performed on the four types of fourth synthesized hologram data a46 through a49, so that a reconstructed image is generated.

Figure 22:
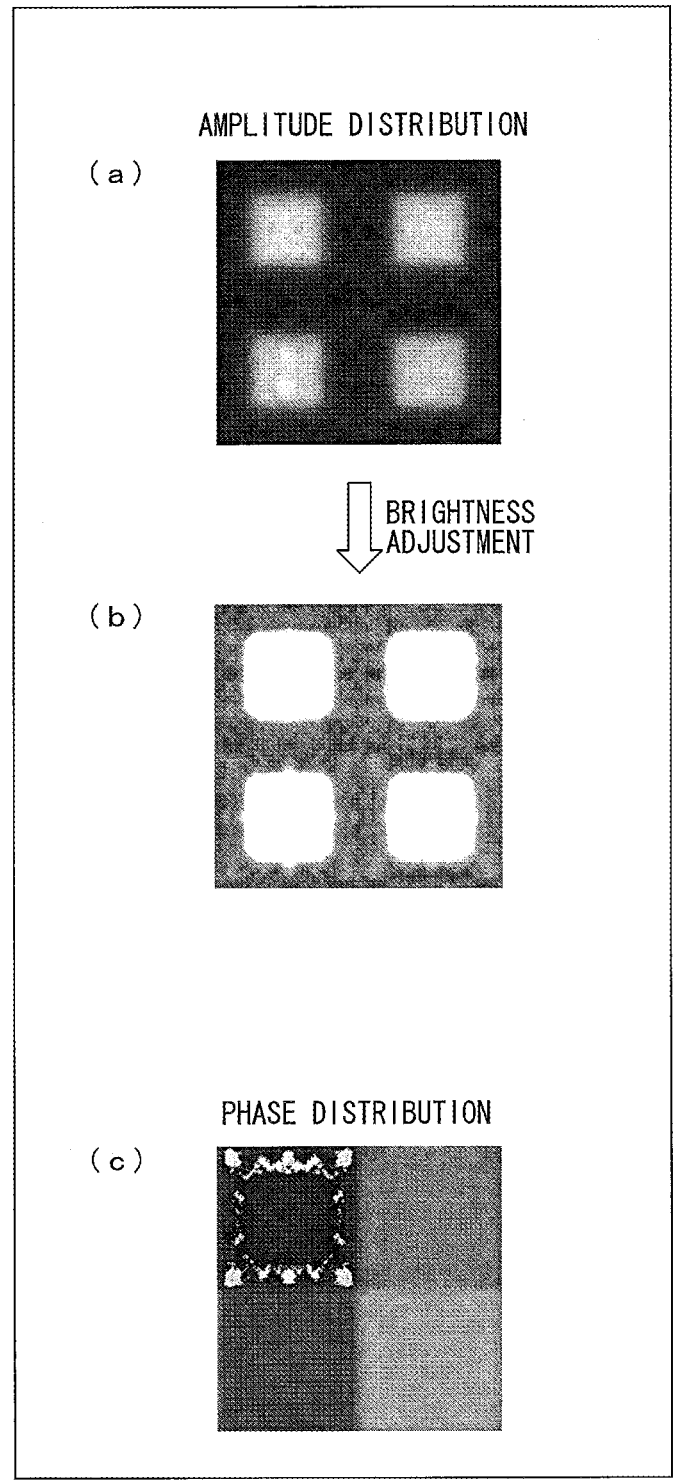
FIG. 22 is a first view illustrating a result obtained in a case where a reconstructed image generated by the parallel four-step phase-shift digital holography device in the Modified Example 5 is generated by computer simulation.
Figure 23:
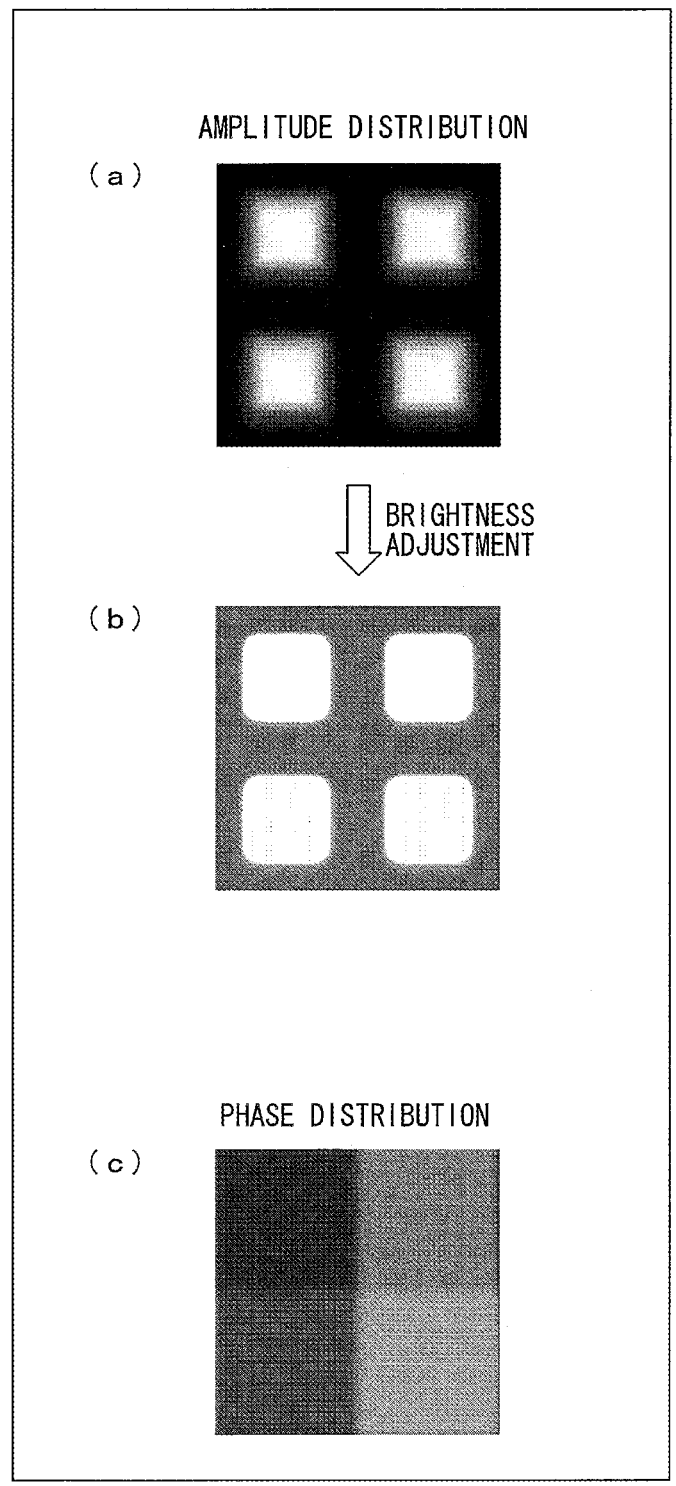
FIG. 23 is a second view illustrating a result obtained in a case where a reconstructed image generated by the parallel four-step phase-shift digital holography device in the Modified Example 5 is generated by computer simulation.

(a) through (c) of FIG. 22 and (a) through (c) of FIG. 23 each show a result obtained in a case where a reconstructed image generated by the parallel four-step phase-shift digital holography device in the Modified Example 5 was generated by computer simulation. Note that parameters used in the computer simulation are shown in FIG. 28. (a) through (c) of FIG. 22 illustrate a reconstructed image generated in a case where high dynamic range synthesis was not applied, and (a) through (c) of FIG. 23 illustrate a reconstructed image generated in a case where high dynamic range synthesis was applied.

As shown in (a) through (c) of FIG. 22, deterioration in image quality is observed both in an amplitude distribution and a phase distribution in the case where high dynamic range synthesis was not applied. In contrast, as shown in (a) through (c) of FIG. 23, in the case where high dynamic range synthesis was applied, an image having an amplitude distribution and a phase distribution similar to those of the object 50 illustrated in (a) and (b) of FIG. 3 was successfully generated. Therefore, in contrast to the case where high dynamic range synthesis was not applied, an improved image quality is observed in the reconstructed image in the case where high dynamic range synthesis was applied.

Note that as in the Modified Example 3, by being combined with the neutral density filter array device 53, the parallel four-step phase-shift digital holography device 400 can also simultaneously obtain hologram data corresponding to different photographic exposure values. In this case, however, it is necessary to change a positional arrangement of either the polarization regions of the polarizer-array device 51A or the neutral density filter regions of the neutral density filter array device 53. Accordingly, hologram data in which pixels corresponding to combinations among four types of phase shift amounts and four types of photographic exposure values are arranged is generated.

Third Embodiment: Off-Axis Type DH Device

A Third Embodiment will describe an example in which the present invention is applied to an off-axis type DH device.

(Sequentially-Recording Off-Axis Type DH Device)

Figure 24:
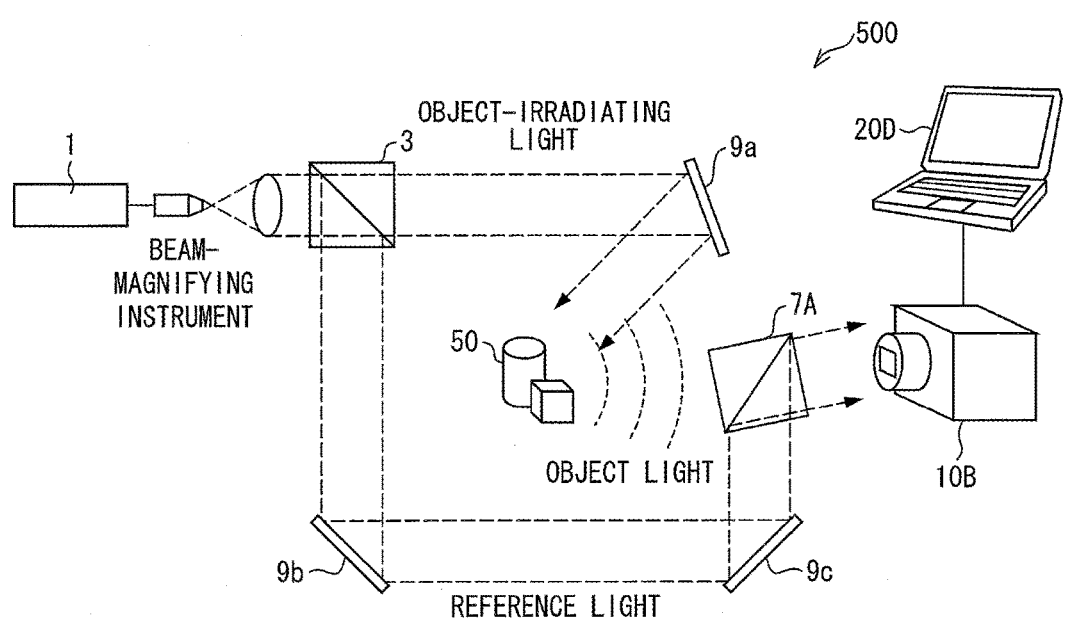
FIG. 24 is a view illustrating an example of a digital holography device in a Third Embodiment.

FIG. 24 is a view illustrating an example of a digital holography device in the Third Embodiment. As illustrated in FIG. 24, an off-axis type digital holography device 500, which is an example of the digital holography device, includes a laser 1, a beam splitter element 3, a beam-combining element 7A, mirrors 9a, 9b, and 9c, an image sensing device 10B, and a computer 20D.

Laser light emitted from the laser 1 enters the beam splitter element 3 through a beam-magnifying instrument, and the beam splitter element 3 causes the laser light emitted from the laser 1 and having entered the beam splitter element 3 to be split in two directions. Laser light (object-irradiating light) that is one of laser light thus split by the beam splitter element 3 in the two directions is reflected from the mirror 9a, and is applied to an object 50. The laser light applied to the object 50 passes through the beam-combining element 7A and enters an image sensor plane of the image sensing device 10A as object light at an angle perpendicular to the image sensor plane.

On the other hand, laser light (reference light) that is the other one of the laser light thus split by the beam splitter element 3 in the two directions is reflected from the mirror 9b and passes through the beam-combining element 7A so as to enter the image sensor plane of the image sensing device 10B as reference light at an angle oblique to the image sensor plane.

In the image sensing device 10B, an interference pattern is formed by interference between the reference light and the object light which enter the image sensor plane so as to have an angular difference between each other. The image sensing device 10B generates sixth hologram data by recording, as a hologram, the interference pattern formed on the image sensor plane. At this time, the image sensing device 10B records holograms sequentially over respective different lengths of photographic exposure time to thereby generate a plurality of sixth hologram data corresponding to respective different photographic exposure values.

The computer 20D generates a reconstructed image by (i) subjecting the plurality of sixth hologram data to high dynamic range synthesis and (ii) then performing a diffraction calculation process such as the Fresnel transformation.

Modified Example 6: Simultaneous-Recording Off-Axis Type DH Device

The off-axis type digital holography device 500 in the Third Embodiment described above with reference to FIG. 24 records holograms sequentially over respective different lengths of photographic exposure time to thereby generate hologram data that correspond to respective different photographic exposure values. An off-axis type digital holography device in a Modified Example 6 generates, in a single-shot recording, a plurality of holograms data that correspond to respective different photographic exposure values. Specifically, the off-axis type digital holography device in the Modified Example 6 has a configuration in which the neutral density filter array device 53 is attached to the image sensor plane of the image sensing device 10B, as illustrated in FIG. 9. According to the configuration, third parallel hologram data that includes pixels corresponding to respective four types of photographic exposure values is generated.

Figure 25:
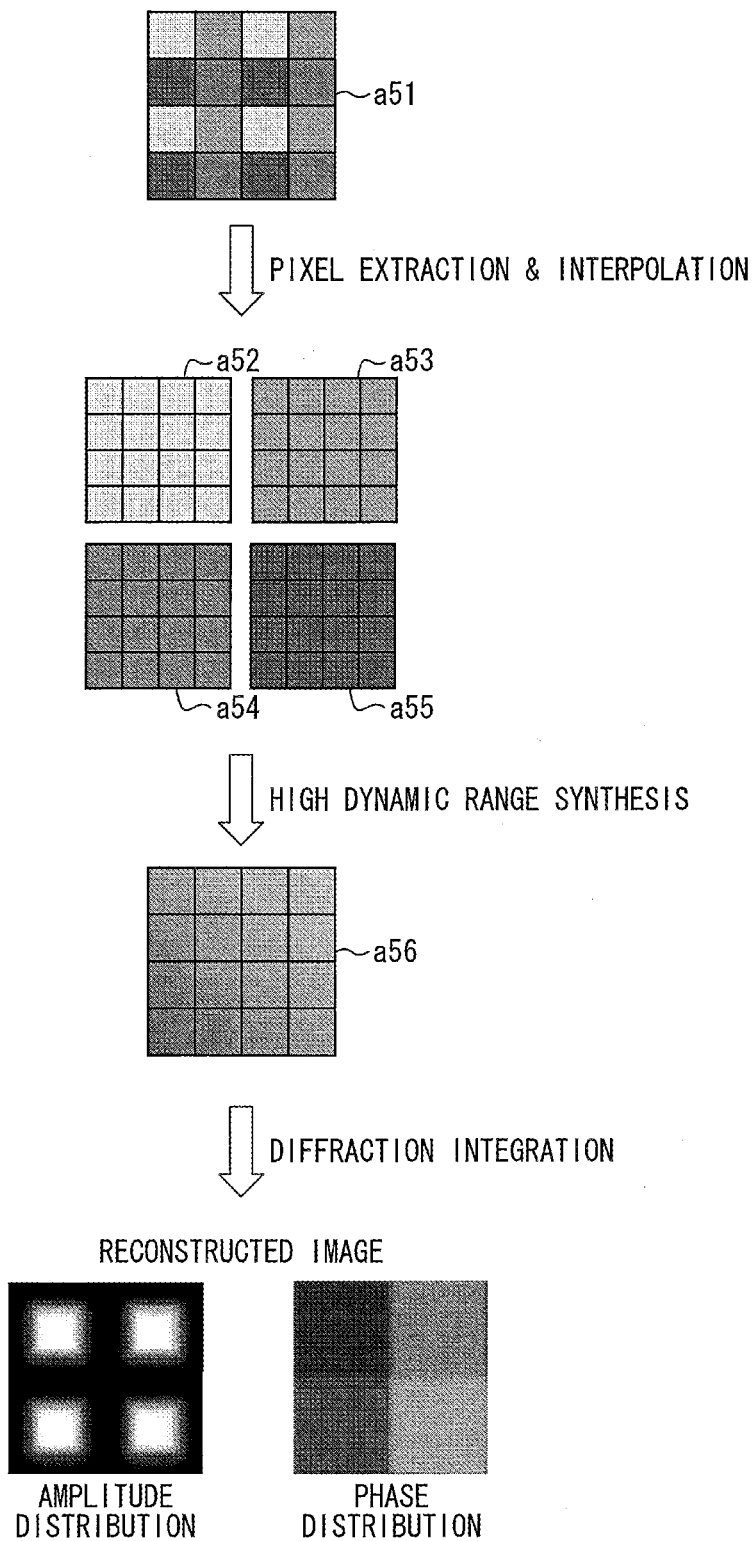
FIG. 25 is a view illustrating a flow of a process of generating a reconstructed image on the basis of hologram data generated by an off-axis type holography device in a Modified Example 6.

FIG. 25 is a view illustrating a flow of a process of generating a reconstructed image on the basis of hologram data generated by the off-axis type holography device in the Modified Example 6. As illustrated in FIG. 25, from the third parallel hologram data a51 (a different-photographic-exposure-value-simultaneously-recorded hologram) including four types of pixels corresponding to respective four types of photographic exposure values, each of the four types of pixels, that is, pixels that correspond to each of the four types of photographic exposure values are extracted, and missing pixels are interpolated. In this way, four types of seventh hologram data a52 through a55, in each of which all pixels correspond to an identical photographic exposure value, are generated. The four types of seventh hologram data a52 through a55 are subjected to high dynamic range synthesis, so that fifth synthesized hologram data a56 is generated. Further, a diffraction calculation process such as the Fresnel transformation is performed on the fifth synthesized hologram data a56, so that a reconstructed image is generated.

Note that it is possible to employ a configuration in which the polarizer 15 (see FIG. 7) and the polarizer-array device 51 (see FIG. 6) are attached to the image sensor plane of the image sensing device 10B in place of the neutral density filter array device 53. In this case, hologram data that corresponds to two types of photographic exposure values can be generated by causing linearly-polarized reference light and linearly-polarized object light to interfere with each other. In a case where elliptically-polarized reference light and elliptically-polarized object light are caused to interfere with each other, the ¼ wave plate 13 (see (b) of FIG. 7) can be provided between the polarizer 15 (see FIG. 7) and the polarizer-array device 51 (see FIG. 6).

As described above, the digital holography device of each of the above-described embodiments includes: an image sensing device recording, in an image sensor and on the basis of an object, a plurality of holograms that correspond to respective different photographic exposure values; and a computer including (i) a high dynamic range hologram-generating section generating a synthesized hologram by performing high dynamic range synthesis on the plurality of holograms recorded, the synthesized hologram including pieces of information ranging from low luminance information to high luminance information and (ii) a reconstructed image-generating section generating a reconstructed image of the object by performing arithmetic processing of phase-shift interferometry, diffraction calculation, and/or the like on the basis of the synthesized hologram.

According to the configuration above, the subject of the high dynamic range synthesis is holograms.

Accordingly, a halation and a blackening which cause deterioration in image quality of a reconstructed image can be eliminated from the holograms, so that a reconstructed image having a high image quality can be generated. This makes it possible to reconstruct an image having no deterioration in image quality caused by a halation or a blackening.

(Other Aspects of the Present Invention)

The digital holography device of the present invention is preferably configured such that: one of the plurality of first holograms is a low photographic exposure value hologram in which the high luminance information is recorded with use of a first photographic exposure value; and another one of the plurality of first holograms is a high photographic exposure value hologram in which the low luminance information is recorded with use of a second photographic exposure value which is higher than the first photographic exposure value.

The digital holography device of the present invention is preferably configured such that the recording section records, in the image sensor and on the basis of the object light and reference light that has a second phase, a second hologram group including a plurality of second holograms that correspond to respective different photographic exposure values, the recording section (i) simultaneously recording the plurality of first holograms, (ii) simultaneously recording the plurality of second holograms, and (iii) simultaneously recording the first hologram group and the second hologram group.

The configuration makes it possible to obtain, in a single-shot recording, (i) a plurality of holograms that have a first phase and correspond to respective different photographic exposure values and (ii) a plurality of holograms that have a second phase and correspond to respective different photographic exposure values.

The digital holography device of the present invention is preferably configured such that the recording section includes: a neutral density filter array in which, in order to record the plurality of first holograms, a first region and a second region which differ in transmissivity are provided so that each of the first region and the second region corresponds to each pixel of the image sensor; and a phase-shift array shifting a phase of reference light that passes through the neutral density filter array.

According to the configuration, the provision of the neutral density filter array makes it possible to record, in a single-shot recording, a hologram obtained with use of a photographic exposure value that varies from pixel to pixel. This eliminates the need to record holograms sequentially while changing a photographic exposure value. Further, the provision of the phase-shift array makes it possible to record, in a single-shot recording, a hologram obtained by shifting a phase on a pixel-by-pixel basis. This makes it possible to shift a phase without using, for example, a member such as a piezoelectric element.

The digital holography device of the present invention is preferably configured such that the recording section includes: a polarizer array in which, in order to record the plurality of first holograms, a first region and a second region which differ in transmission axis are provided so that each of the first region and the second region corresponds to each pixel of the image sensor; and a polarizer converting, into linearly-polarized light, each of object light and reference light that travel toward the polarizer array.

The configuration makes it possible to record a hologram obtained with use of a photographic exposure value that varies from pixel to pixel. This eliminates the need to record holograms sequentially while changing a photographic exposure value.

The digital holography device of the present invention can be configured such that the recording section further includes a ¼ wave plate converting, into elliptically-polarized light, the linearly-polarized light converted by the polarizer.

The digital holography device of the present invention can be configured such that the recording section further includes a phase-shift section shifting a phase of the reference light that passes through the polarizer array.

The digital holography device of the present invention can be configured such that: the recording section records, in the image sensor and on the basis of the object light and reference light that has a second phase, a second hologram group including a plurality of second holograms that correspond to respective different photographic exposure values; the high dynamic range hologram-generating section generates a second high dynamic range hologram by synthesizing the second hologram group, the second high dynamic range hologram including pieces of information ranging from low luminance information to high luminance information; and the reconstructed image-generating section generates a reconstructed image of the object by performing arithmetic processing of phase-shift interferometry and diffraction calculation on the basis of the first high dynamic range hologram and the second high dynamic range hologram.

The digital holography device of the present invention can be configured such that the reconstructed image-generating section generates, on the basis of a different-photographic-exposure-values-simultaneously-recorded hologram in which the plurality of first holograms are simultaneously recorded with use of the different photographic exposure values, a hologram obtained by (i) extracting pixels from the different-photographic-exposure-values-simultaneously-recorded hologram for each of the photographic exposure values and (ii) performing pixel interpolation.

The digital holography device of the present invention is preferably configured such that the recording section records, in the image sensor and on the basis of the object light and reference light that has a second phase, a second hologram group including a plurality of second holograms that correspond to respective different photographic exposure values, the recording section (i) sequentially recording the plurality of first holograms, (ii) sequentially recording the plurality of second holograms, and (iii) simultaneously recording (a) one of the plurality of first holograms and (b) one of the plurality of second holograms, the one of the plurality of first holograms and the one of the plurality of second holograms corresponding to each other in photographic exposure value.

The configuration makes it possible to record holograms that have respective different phases.

The digital holography device of the present invention can be configured such that the recording section includes a polarizer-array device in which four types of polarization regions, which have respective transmission axes that point to four different directions, are arranged so that each of the four types of polarization regions corresponds to each pixel of the image sensor.

The digital holography device of the present invention is preferably configured such that the recording section records, in the image sensor and on the basis of the object light and reference light that has a second phase, a second hologram group including a plurality of second holograms that correspond to respective different photographic exposure values, the recording section (i) simultaneously recording the plurality of first holograms, (ii) simultaneously recording the plurality of second holograms, and (iii) sequentially recording the first hologram group and the second hologram group.

The configuration makes it possible to record simultaneously holograms that correspond to respective different photographic exposure values.

The digital holography device of the present invention is preferably configured such that the recording section includes a neutral density filter array in which, in order to record the plurality of first holograms, a first region and a second region which differ in transmissivity are provided so that each of the first region and the second region corresponds to each pixel of the image sensor.

The configuration makes it possible to record, in a single-shot recording, a hologram obtained with use of a photographic exposure value that varies from pixel to pixel. This eliminates the need to record holograms sequentially while changing a photographic exposure value.

The digital holography device of the present invention is preferably configured such that the recording section includes a polarizer array in which, in order to record the plurality of first holograms, a first region and a second region which differ in transmission axis are each provided so as to correspond to each pixel of the image sensor.

The configuration makes it possible to record, in a single-shot recording, a hologram obtained with use of a photographic exposure value that varies from pixel to pixel. This eliminates the need to record holograms sequentially while changing a photographic exposure value.

The digital holography device of the present invention is preferably configured such that the recording section records, in the image sensor and on the basis of the object light and reference light that has a second phase, a second hologram group including a plurality of second holograms that correspond to respective different photographic exposure values, the recording section (i) sequentially recording the plurality of first holograms, (ii) sequentially recording the plurality of second holograms, and (iii) sequentially recording the first hologram group and the second hologram group.

According to the configuration, holograms corresponding to respective different photographic exposure values are sequentially recorded, and holograms corresponding to respective different phases of reference light are sequentially recorded. This makes it possible to record a desired hologram with use of a simple configuration.

The digital holography device of the present invention can be configured such that the recording section includes a piezoelectric element-driven reflecting mirror changing a phase of the reference light by changing an optical path length.

The digital holography device of the present invention is preferably configured such that: the object light and the reference light enter the image sensor at respective different angles; and the recording section simultaneously records the plurality of first holograms.

The configuration allows an off-axis type digital holography device to record simultaneously holograms corresponding to respective different photographic exposure values.

The digital holography device of the present invention is preferably configured such that the recording section includes a neutral density filter array in which, in order to record the plurality of first holograms, a first region and a second region which differ in transmissivity are provided so that each of the first region and the second region corresponds to each pixel of the image sensor.

The configuration makes it possible to record, in a single-shot recording, a hologram obtained with use of a photographic exposure value that varies from pixel to pixel. This eliminates the need to record holograms sequentially while changing a photographic exposure value.

The digital holography device of the present invention is preferably configured such that: the object light and the reference light enter the image sensor at respective different angles; and the recording section sequentially records the plurality of first holograms.

The configuration allows an off-axis type digital holography device to record a hologram with use of a simple configuration.

(Additional Matter)

In order to attain the object, a digital holography device of the present invention includes: a recording section recording, in an image sensor and on the basis of an object, a plurality of first holograms that correspond to respective different photographic exposure values; a high dynamic range hologram-generating section generating a high dynamic range hologram by synthesizing the plurality of first holograms recorded, the high dynamic range hologram including pieces of information ranging from low luminance information to high luminance information; and a reconstructed image-generating section generating a reconstructed image of the object by performing arithmetic processing of phase-shift interferometry, diffraction calculation, and the like on the basis of the high dynamic range hologram.

According to the configuration above, the subject of the high dynamic range synthesis is holograms. Accordingly, an influence of a halation and a blackening which cause deterioration in image quality of a reconstructed image can be eliminated from the holograms, so that a reconstructed image having a high image quality can be generated. This makes it possible to provide a digital holography device that enables to reconstruct an image having no deterioration in image quality caused by a halation or a blackening.

Specifically, one of the plurality of first holograms is a low photographic exposure value hologram in which the high luminance information is recorded with use of a first photographic exposure value; and another one of the plurality of first holograms is a high photographic exposure value hologram in which the low luminance information is recorded with use of a second photographic exposure value which is higher than the first photographic exposure value.

Further, the digital holography device of the present invention is configured such that the recording section includes a neutral density filter array in which, in order to record the plurality of first holograms, a first region and a second region which differ in transmissivity are provided so that each of the first region and the second region corresponds to each pixel of the image sensor.

The configuration makes it possible to record, in a single-shot recording, a hologram obtained with use of a photographic exposure value that varies from pixel to pixel. This eliminates the need to record holograms sequentially while changing a photographic exposure value.

Further, the digital holography device of the present invention is configured such that the recording section includes a phase-shift array shifting a phase of reference light that passes through the neutral density filter array.

According to the configuration, the provision of the phase-shift array makes it possible to record, in a single-shot recording, a hologram obtained by shifting a phase on a pixel-by-pixel basis. This makes it possible to shift a phase without using, for example, a member such as a piezoelectric element.

Further, the digital holography device of the present invention is configured such that object light and reference light, which are caused to interfere with each other in order to generate the hologram, enter the image sensor at respective different angles.

The configuration allows a desired image component, zeroth-order diffracted light, and a conjugate image to be spatially separated from each other. This eliminates the need to use, for example, a member for shifting a phase such as a piezoelectric element.

Further, the digital holography device of the present invention is configured such that the recording section includes a polarizer array in which, in order to record the plurality of first holograms, a first region and a second region which differ in transmission axis are each provided so as to correspond to each pixel of the image sensor.

The configuration makes it possible to record a hologram obtained with use of a photographic exposure value that varies from pixel to pixel. This eliminates the need to record holograms sequentially while changing a photographic exposure value.

Further, the digital holography device of the present invention can be configured such that the recording section includes a polarizer converting, into linearly-polarized light, each of object light and reference light that travel toward the polarizer array.

Further, the digital holography device of the present invention can be configured such that the recording section further includes a ¼ wave plate converting, into elliptically-polarized light, the linearly-polarized light converted by the polarizer.

Further, the digital holography device of the present invention can be configured such that the recording section further includes a phase-shift section shifting a phase of the reference light that passes through the polarizer array.

Further, the digital holography device of the present invention can be configured such that object light and reference light, which are caused to interfere with each other in order to generate the hologram, enter the image sensor at respective different angles.

Further, the digital holography device of the present invention is configured such that the recording section sequentially records, in the image sensor, the low photographic exposure value hologram and the high photographic exposure value hologram.

According to the configuration, by recording a hologram a plurality of times with respective different lengths of photographic exposure time, respective different outputs of a light source used for generating object-irradiating light and reference light, and the like, it is possible to record a plurality of holograms obtained with use of respective different photographic exposure values. In this case, it is not necessary to use, for example, a member such as a neutral density filter array.

Further, the digital holography device of the present invention can be configured such that: the recording section records, for each of a first phase and a second phase of reference light, a plurality of holograms that correspond to the respective different photographic exposure values, the first phase and the second phase being different from each other; and the high dynamic range hologram-generating section (i) generates a high dynamic range hologram corresponding to the first phase by synthesizing the plurality of holograms that correspond to the first phase and (ii) generates a high dynamic range hologram corresponding to the second phase by synthesizing the plurality of holograms that correspond to the second phase.

Further, the digital holography device of the present invention is configured such that the reconstructed image-generating section generates a hologram for calculation of phase-shift interferometry, on the basis of the high dynamic range hologram by (i) extracting pixels from the high dynamic range hologram for each of a first phase and a second phase of reference light, the first phase and the second phase being different from each other and (ii) performing pixel interpolation.

The configuration makes it possible to generate a hologram in which all pixels have a first phase and a hologram in which all pixels have a second phase.

Further, in order to attain the object, a digital holography reconstruction method of the present invention includes the steps of: recording, in an image sensor and on the basis of an object, a plurality of first holograms that correspond to respective different photographic exposure values; generating a first high dynamic range hologram by synthesizing the plurality of first holograms recorded, the first high dynamic range hologram including pieces of information ranging from low luminance information to high luminance information; and generating a reconstructed image of the object by performing arithmetic processing of phase-shift interferometry, diffraction calculation, and/or the like on the basis of the first high dynamic range hologram.

The configuration makes it possible to provide a digital holography reconstruct method that enables to reconstruct an image having no deterioration in image quality caused by a halation or a blackening.

The present invention is not limited to the above-described embodiments but allows various modifications within the scope of the claims. Any embodiment derived from an appropriate combination of the technical means disclosed in the different embodiments will also be included in the technical scope of the present invention.

REFERENCE SIGNS LIST

1: LASER
3: BEAM SPLITTER ELEMENT
5: BEAM SPLITTER ELEMENT
7 and 7A: BEAM-COMBINING ELEMENT
9a through 9c: MIRROR
10, 10A, 10B, and 10C: IMAGE SENSING DEVICE (RECORDING SECTION)
11: PIEZOELECTRIC ELEMENT-DRIVEN REFLECTING MIRROR
11a: PIEZOELECTRIC ELEMENT
11b: REFLECTING MIRROR
13: ¼ WAVE PLATE 15 and 15A: POLARIZER
17: PHASE-DELAYING ELEMENT ARRAY (PHASE-SHIFT SECTION)
17a and 17b: PHASE-DELAYING ELEMENT
19: ½ WAVE PLATE
20, 20A, and 20B: COMPUTER (HIGH DYNAMIC RANGE HOLOGRAM-GENERATING SECTION, RECONSTRUCTED IMAGE-GENERATING SECTION)
51 and 51A: POLARIZER-ARRAY DEVICE (PHASE-SHIFT ARRAY)
51a and 51b: POLARIZER ARRAY
51e, 51f, 51g, and 51h: POLARIZER ARRAY
53: NEUTRAL DENSITY FILTER ARRAY DEVICE
53a through 53d: NEUTRAL DENSITY FILTER ARRAY
100: PHASE-SHIFT DIGITAL HOLOGRAPHY DEVICE
200: PARALLEL TWO-STEP PHASE-SHIFT DIGITAL HOLOGRAPHY DEVICE
300: PARALLEL TWO-STEP PHASE-SHIFT DIGITAL HOLOGRAPHY DEVICE
400: PARALLEL FOUR-STEP PHASE-SHIFT DIGITAL HOLOGRAPHY DEVICE
500: OFF-AXIS TYPE DIGITAL HOLOGRAPHY DEVICE

The invention claimed is:

1. A digital holography device comprising:
an image sensor configured to photograph a first hologram in which plural types of pixels corresponding to respective different photographic exposure values are arranged, the first hologram being an interference pattern of interference between object light that corresponds to an object and reference light, the object light and the reference light entering the image sensor at respective different angles, the plural types of pixels in the first hologram each recording information of the object such that the information is distributed,
the image sensor including a neutral density filter array in which a plurality of regions which differ in transmissivity are provided so that each of the plurality of regions corresponds to each pixel of the image sensor, in order to record, in a single photographing operation, the first hologram in which the plural types of pixels corresponding to respective different exposure values are arranged;
an extraction section configured to extract, out of the plural types of pixels corresponding to respective different photographic exposure values in the first hologram, a single type of pixels corresponding to an identical photographic exposure value;
an interpolation section configured to interpolate missing pixels in the single type of pixels corresponding to an identical photographic exposure value which are extracted in the extraction section, so as to generate a plurality of second holograms each consisting of the single type of pixels corresponding to an identical photographic exposure value, the plurality of second holograms corresponding in number to the plural types of pixels;
a high dynamic range hologram-generating section configured to generate a synthesized hologram from the plurality of second holograms, the synthesized hologram including pieces of information ranging from low luminance information to high luminance information, the synthesized hologram being higher in dynamic range than any of the plurality of second holograms; and
a reconstructed image-generating section configured to generate a reconstructed image of the object by performing arithmetic processing of diffraction calculation on the basis of the synthesized hologram to obtain intensity information and phase information.

2. The digital holography device as set forth in claim 1, wherein:
one of the plurality of first holograms is a low photographic exposure value hologram in which the high luminance information is recorded with use of a first photographic exposure value; and
another one of the plurality of first holograms is a high photographic exposure value hologram in which the low luminance information is recorded with use of a second photographic exposure value which is higher than the first photographic exposure value.

3. The digital holography device as set forth in claim 1, wherein the image sensor photographs, on the basis of the object light and reference light that has a second phase, a second hologram group including a plurality of second holograms that correspond to respective different photographic exposure values,
the image sensor (i) simultaneously photographing the plurality of first holograms, (ii) simultaneously photographing the plurality of second holograms, and (iii) simultaneously photographing the first hologram group and the second hologram group.

4. The digital holography device as set forth in claim 3, further comprising:
a neutral density filter array in which, in order to record the plurality of first holograms, a first region and a second region which differ in transmissivity are provided so that each of the first region and the second region corresponds to each pixel of the image sensor; and
a phase-shift array shifting a phase of reference light that passes through the neutral density filter array.

5. The digital holography device as set forth in claim 3, further comprising:
a polarizer array in which, in order to record the plurality of first holograms, a first region and a second region which differ in transmission axis are provided so that each of the first region and the second region corresponds to each pixel of the image sensor; and
a polarizer converting, into linearly-polarized light, each of object light and reference light that travel toward the polarizer array.

6. The digital holography device as set forth in claim 5, further comprising a ¼ wave plate converting, into elliptically-polarized light, the linearly-polarized light converted by the polarizer.

7. The digital holography device as set forth in claim 5, further comprising a phase-shift section shifting a phase of the reference light that passes through the polarizer array.

8. The digital holography device as set forth in claim 1, wherein:
the image sensor photographs, on the basis of the object light and reference light that has a second phase, a second hologram group including a plurality of second holograms that correspond to respective different photographic exposure values;
the high dynamic range hologram-generating section generates a second high dynamic range hologram by synthesizing the second hologram group, the second high dynamic range hologram including pieces of information ranging from low luminance information to high luminance information; and the reconstructed image-generating section generates a reconstructed image of the object by performing arithmetic processing of phase-shift interferometry and diffraction calculation on the basis of the first high dynamic range hologram and the second high dynamic range hologram.

9. The digital holography device as set forth in claim 1, wherein the reconstructed image-generating section generates, on the basis of a different-photographic-exposure-values-simultaneously-recorded hologram in which the plurality of first holograms are simultaneously recorded with use of the different photographic exposure values, a hologram obtained by (i) extracting pixels from the different-photographic-exposure-values-simultaneously-recorded hologram for each of the photographic exposure values and (ii) performing pixel interpolation.

10. The digital holography device as set forth in claim 1, wherein the image sensor photographs, on the basis of the object light and reference light that has a second phase, a second hologram group including a plurality of second holograms that correspond to respective different photographic exposure values,
the image sensor (i) sequentially photographing the plurality of first holograms, (ii) sequentially photographing the plurality of second holograms, and (iii) simultaneously photographing (a) one of the plurality of first holograms and (b) one of the plurality of second holograms, the one of the plurality of first holograms and the one of the plurality of second holograms corresponding to each other in photographic exposure value.

11. The digital holography device as set forth in claim 10, further comprising a polarizer-array device in which four types of polarization regions, which have respective transmission axes that point to four different directions, are arranged so that each of the four types of polarization regions corresponds to each pixel of the image sensor.

12. The digital holography device as set forth in claim 1, wherein the image sensor photographs, on the basis of the object light and reference light that has a second phase, a second hologram group including a plurality of second holograms that correspond to respective different photographic exposure values,
the image sensor (i) simultaneously photographing the plurality of first holograms, (ii) simultaneously photographing the plurality of second holograms, and (iii) sequentially photographing the first hologram group and the second hologram group.

13. The digital holography device as set forth in claim 12, further comprising a neutral density filter array in which, in order to photograph the plurality of first holograms, a first region and a second region which differ in transmissivity are provided so that each of the first region and the second region corresponds to each pixel of the image sensor.

14. The digital holography device as set forth in claim 12, further comprising a polarizer array in which, in order to photograph the plurality of first holograms, a first region and a second region which differ in transmission axis are each provided so as to correspond to each pixel of the image sensor.

15. The digital holography device as set forth in claim 1, wherein the image sensor photographs, on the basis of the object light and reference light that has a second phase, a second hologram group including a plurality of second holograms that correspond to respective different photographic exposure values,
the image sensor (i) sequentially photographing the plurality of first holograms, (ii) sequentially photographing the plurality of second holograms, and (iii) sequentially photographing the first hologram group and the second hologram group.

16. The digital holography device as set forth in claim 15, further comprising a piezoelectric element-driven reflecting mirror changing a phase of the reference light by changing an optical path length.

* * * * *